(12) United States Patent
Ofer et al.

(10) Patent No.: US 7,697,554 B1
(45) Date of Patent: *Apr. 13, 2010

(54) ON-LINE DATA MIGRATION OF A LOGICAL/VIRTUAL STORAGE ARRAY BY REPLACING VIRTUAL NAMES

(75) Inventors: Adi Ofer, Framingham, MA (US); Kiran Madnani, Framingham, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 947 days.

This patent is subject to a terminal disclaimer.

(21) Appl. No.: 11/318,734

(22) Filed: Dec. 27, 2005

(51) Int. Cl.
- H04L 12/28 (2006.01)
- H04Q 11/00 (2006.01)
- G06F 11/00 (2006.01)
- G06F 21/00 (2006.01)
- G06F 15/167 (2006.01)

(52) U.S. Cl. .......................... 370/412; 370/381; 714/4; 711/6; 709/213

(58) Field of Classification Search ............. 711/5, 711/6, 165; 370/351, 389, 392, 401, 381, 370/412, 229; 709/213; 714/4
See application file for complete search history.

(56) References Cited

U.S. PATENT DOCUMENTS

| | | | |
|---|---|---|---|
| 5,247,632 | A | 9/1993 | Newman |
| 5,568,629 | A | 10/1996 | Gentry et al. |
| 5,963,555 | A | 10/1999 | Takase et al. |
| 6,336,152 | B1 | 1/2002 | Richman et al. |
| 6,421,711 | B1 | 7/2002 | Blumenau et al. |
| 6,563,834 | B1 | 5/2003 | Ogawa |
| 6,684,209 | B1 | 1/2004 | Ito et al. |
| 6,839,750 | B1 | 1/2005 | Bauer et al. |

(Continued)

FOREIGN PATENT DOCUMENTS

EP    1130514 A2    9/2001

(Continued)

OTHER PUBLICATIONS

Madnani; U.S. Appl. No. 11/318,757, filed Dec. 27, 2005; 35 pages.

(Continued)

*Primary Examiner*—Hong Cho
*Assistant Examiner*—Hicham B Foud
(74) *Attorney, Agent, or Firm*—Guerin & Rodriguez, LLP; Mary M. Steubing

(57) ABSTRACT

Data is transparently migrated between groups of logical units of storage presented as virtual arrays. A source virtual array has at least one source virtual port coupled to a fabric. Each source virtual port having a source virtual port name and a source virtual port address. A destination virtual array has one or more destination virtual ports coupled to the fabric, each destination virtual port having a destination virtual port name and a destination virtual port address. All data resident on the source virtual array is copied to the destination virtual array. The destination virtual port names and LUN names and numbers are then replaced with the source virtual port names and LUN names and numbers. The fabric then updates its name server database so that the database associates the source virtual port name with the destination virtual port address.

18 Claims, 29 Drawing Sheets

U.S. PATENT DOCUMENTS

| | | |
|---|---|---|
| 6,944,785 B2 | 9/2005 | Gadir et al. |
| 7,043,663 B1 | 5/2006 | Pittelkow et al. |
| 7,051,101 B1 | 5/2006 | Dubrovsky et al. |
| 7,120,728 B2 | 10/2006 | Krakirian et al. |
| 7,124,143 B2 * | 10/2006 | Matsunami et al. ......... 707/101 |
| 7,260,737 B1 | 8/2007 | Lent et al. |
| 7,318,120 B2 | 1/2008 | Rust et al. |
| 7,340,639 B1 | 3/2008 | Lee et al. |
| 7,366,846 B2 | 4/2008 | Boyd et al. |
| 7,398,421 B1 | 7/2008 | Limaye et al. |
| 7,433,948 B2 | 10/2008 | Edsall et al. |
| 7,500,134 B2 | 3/2009 | Madnani et al. |
| 2002/0071386 A1 | 6/2002 | Gronke |
| 2003/0018927 A1 | 1/2003 | Gadir et al. |
| 2003/0131182 A1 * | 7/2003 | Kumar et al. .................. 711/5 |
| 2004/0133576 A1 | 7/2004 | Ito et al. |
| 2004/0139240 A1 | 7/2004 | DiCorpo et al. |
| 2004/0151188 A1 | 8/2004 | Maveli et al. |
| 2004/0177228 A1 | 9/2004 | Leonhardt et al. |
| 2004/0213272 A1 | 10/2004 | Nishi et al. |
| 2004/0243710 A1 | 12/2004 | Mao |
| 2005/0008016 A1 | 1/2005 | Shimozono et al. |
| 2005/0010688 A1 | 1/2005 | Murakami et al. |
| 2005/0120160 A1 | 6/2005 | Plouffe et al. |
| 2005/0243611 A1 | 11/2005 | Lubbers et al. |
| 2005/0251620 A1 | 11/2005 | Matsunami et al. |
| 2006/0041595 A1 | 2/2006 | Taguchi et al. |
| 2006/0064466 A1 | 3/2006 | Shiga et al. |
| 2006/0075005 A1 | 4/2006 | Kano et al. |
| 2006/0080516 A1 | 4/2006 | Paveza et al. |
| 2006/0107010 A1 * | 5/2006 | Hirezaki et al. ............. 711/165 |
| 2006/0155777 A1 | 7/2006 | Shih et al. |
| 2006/0190698 A1 | 8/2006 | Mizuno et al. |
| 2007/0220310 A1 | 9/2007 | Sharma et al. |
| 2007/0234342 A1 | 10/2007 | Flynn et al. |
| 2007/0266212 A1 | 11/2007 | Uchikado et al. |
| 2007/0291785 A1 | 12/2007 | Sharma et al. |
| 2008/0005468 A1 | 1/2008 | Faibish et al. |

FOREIGN PATENT DOCUMENTS

| | | |
|---|---|---|
| EP | 1357465 A | 10/2003 |
| WO | WO 03/062979 A | 7/2003 |

OTHER PUBLICATIONS

Ofer; U.S. Appl. No. 11/318,719, filed Dec. 27, 2005; 73 pages.
Madnani; U.S. Appl. No. 11/318,675, filed Dec. 27, 2005; 90 pages.
Brown, et al.; U.S. Appl. No. 11/427,646, filed Jun. 29, 2006; 47 pages.
Ofer, et al.; U.S. Appl. No. 11/427,759, filed Jun. 29, 2006; 76 pages.
Ofer, et al.; U.S. Appl. No. 11/427,724, filed Jun. 29, 2006; 78 pages.
Madnani, et al.; U.S. Appl. No. 11/427,731, filed Jun. 29, 2006; 82 pages.
Madnani, et al.; U.S. Appl. No. 11/427,744, filed Jun. 29, 2006; 83 pages.
Ofer, et al.; U.S. Appl. No. 11/427,749, filed Jun. 29, 2006; 76 pages.
Charles Millilgan et al., Online Storage Virtualization: The key to managing the data explosion, Proceedings of the 35th Hawaii International Conference on System Sciences, 2002, IEEE.
Office Action mailed Mar. 19, 2008 for U.S. Appl. No. 11/427,759.
Office Action mailed Mar. 20, 2008 for U.S. Appl. No. 11/427,731.
Office Action mailed Mar. 20, 2008 for U.S. Appl. No. 11/427,744.
Office Action mailed Mar. 18, 2008 for U.S. Appl. No. 11/427,749.
Notice of Allowance mailed Jun. 12, 2008 for U.S. Appl. No. 11/318,675.
Office Action mailed Jul. 16, 2008 for U.S. Appl. No. 11/318,757.
Office Action mailed Sep. 3, 2008 for U.S. Appl. No. 11/427,646.
Office Action for U.S. Appl. No. 11/427,749 mailed Sep. 17, 2008 (21 pages).
Office Action mailed Jun. 22, 2009 for U.S. Appl. No. 11/318,757.
Office Action mailed Jul. 20, 2009 for U.S. Appl. No. 11/427,724.
Office Action mailed Oct. 1, 2008 for U.S. Appl. No. 11/318,719.
Office Action mailed Dec. 9, 2008 for U.S. Appl. No. 11/427,724.
Office Action mailed Mar. 5, 2009 for U.S. Appl. No. 11/427,646.
Office Action mailed Mar. 17, 2009 for U.S. Appl. No. 11/427,759.
Office Action mailed Apr. 27, 2009 for U.S. Appl. No. 11/427,731.
Office Action mailed Apr. 27, 2009 for U.S. Appl. No. 11/427,744.
Office Action mailed Apr. 27, 2009 for U.S. Appl. No. 11/427,749.
Office Action mailed May 11, 2009 for U.S. Appl. No. 11/318,719.
Office Action mailed Oct. 2, 2009 for U.S. Appl. No. 11/771,604.
Office Action mailed Nov. 27, 2009 for U.S. Appl. No. 11/771,686.
Final Office Action mailed Oct. 28, 2009 for U.S. Appl. No. 11/318,719.
Notice of Allowance mailed Dec. 3, 2009 for U.S. Appl. No. 11/318,719.
Final Office Action mailed Dec. 29, 2009 for U.S. Appl. No. 11/427,731.
Notice of Allowance mailed Nov. 16, 2009 for U.S. Appl. No. 11/427,646.
Final Office Action mailed Dec. 2, 2009 for U.S. Appl. No. 11/427,759.
Final Office Action mailed Dec. 14, 2009 for U.S. Appl. No. 11/427,744.
Final Office Action mailed Dec. 14, 2009 for U.S. Appl. No. 11/427,749.

* cited by examiner

Prior Art

Prior Art

Prior Art

| LUN Name | Port ID | LUN # |
|---|---|---|
| a0 | 0 | L00 |
| b0 | 0 | L01 |
| c0 | 0 | L02 |
| d0 | 0 | L10 |
| e0 | 0 | L11 |
| f0 | 0 | L12 |
| g0 | 0 | L20 |
| h0 | 0 | L21 |
| i0 | 0 | L22 |
| j0 | 0 | L30 |
| k0 | 0 | L31 |
| l0 | 0 | L32 |
| m0 | 0 | L40 |
| n0 | 0 | L41 |
| p0 | 0 | L42 |
| q0 | 0 | L50 |
| r0 | 0 | L51 |
| s0 | 0 | L52 |
| a1 | 1 | L60 |
| b1 | 1 | L61 |
| c1 | 1 | L62 |
| d1 | 1 | L70 |
| e1 | 1 | L71 |
| f1 | 1 | L72 |
| g1 | 1 | L80 |
| h1 | 1 | L81 |
| i1 | 1 | L82 |
| j1 | 1 | L90 |
| k1 | 1 | L91 |
| l1 | 1 | L92 |

Fig. 5

| Port Name | Port ID | Virtual Port name | Virtual Port ID |
|---|---|---|---|
| apa | 0 | vn0 | v0 |
| apa | 0 | vn1 | v1 |
| apa | 0 | vn2 | v2 |
| apb | 1 | vn3 | v3 |
| apb | 1 | vn4 | v4 |
| apb | 1 | vn5 | v5 |

| LUN Name | Virtual Port ID | LUN # |
|---|---|---|
| a0 | v0 | L00 |
| b0 | v0 | L01 |
| c0 | v0 | L02 |
| d0 | v0 | L10 |
| e0 | v0 | L11 |
| f0 | v0 | L12 |

| LUN Name | Virtual Port ID | LUN # |
|---|---|---|
| g0 | v1 | L20 |
| h0 | v1 | L21 |
| i0 | v1 | L22 |
| j0 | v1 | L30 |
| k0 | v1 | L31 |
| l0 | v1 | L32 |

Fig. 12B

| Port Name | Port ID | Virtual Port name | Virtual Port ID |
|---|---|---|---|
| apa | 0 | vn00 | v00 |
| apa | 0 | vn10 | v10 |
| apb | 1 | vn30 | v30 |
| apb | 1 | vn40 | v40 |

Fig. 15

| LUN Name | Virtual Port ID | LUN # |
|---|---|---|
| a0 | v00 | L00 |
| b0 | v00 | L01 |
| c0 | v00 | L02 |
| d0 | v00 | L10 |
| e0 | v00 | L11 |
| f0 | v00 | L12 |
| g0 | v10 | L20 |
| h0 | v10 | L21 |
| i0 | v10 | L22 |
| j0 | v10 | L30 |
| k0 | v10 | L31 |
| l0 | v10 | L32 |
| a1 | v30 | L60 |
| b1 | v30 | L61 |
| c1 | v30 | L62 |
| d1 | v30 | L70 |
| e1 | v30 | L71 |
| f1 | v30 | L72 |
| g1 | v40 | L80 |
| h1 | v40 | L81 |
| i1 | v40 | L82 |
| j1 | v40 | L90 |
| k1 | v40 | L91 |
| l1 | v40 | L92 |

Fig. 16

| Port Name | Port ID | Virtual Port name / Virtual Port ID | Virtual Port ID |
|---|---|---|---|
| apa | 0 | vn40 | v00 |
| apa | 0 | vn10 | v10 |
| apb | 1 | vn30 | v30 |
| apb | 1 | vn00 | v40 |

Fig. 18

| LUN Name | Virtual Port ID | LUN # |
|---|---|---|
| a0 | v40 | L00 |
| b0 | v40 | L01 |
| c0 | v40 | L02 |
| d0 | v40 | L10 |
| e0 | v40 | L11 |
| f0 | v40 | L12 |
| g0 | v40 | L20 |
| h0 | v10 | L21 |
| i0 | v10 | L22 |
| j0 | v10 | L30 |
| k0 | v10 | L31 |
| l0 | v10 | L32 |
| a1 | v30 | L60 |
| b1 | v30 | L61 |
| c1 | v30 | L62 |
| d1 | v30 | L70 |
| e1 | v30 | L71 |
| f1 | v30 | L72 |
| g1 | v00 | L80 |
| h1 | v00 | L81 |
| i1 | v00 | L82 |
| j1 | v00 | L90 |
| k1 | v00 | L91 |
| l1 | v00 | L92 |

Fig. 19

ON-LINE DATA MIGRATION OF A LOGICAL/VIRTUAL STORAGE ARRAY BY REPLACING VIRTUAL NAMES

FIELD OF THE INVENTION

The present invention relates generally to the field of storage systems, and particularly to the migration of data between virtual arrays.

BACKGROUND OF THE INVENTION

Today's enterprise data centers store ever-larger amounts of business critical data that must be immediately and continuously available. Ever larger and more complex storage systems are used for storage of the data. Many different hosts and applications access data on these storage systems. In order to provide security and prevent data corruption, it is often necessary to ensure that the applications and hosts have exclusive access to particular areas of storage in the system.

One mechanism for partitioning storage systems employs the concept of "virtual arrays". Accordingly, software is provided within a storage array to logically partition the array into separate storage groups. Each storage group includes at least one host and a set of logical units of storage. The logical units of storage in the group are accessible only to the hosts in the group. Other hosts cannot access a storage group to which they have not been granted access. Unfortunately, the current methods for partitioning storage arrays into virtual arrays are highly complex and expensive, and operate only at the storage array level. It is desirable to provide a simpler, inexpensive means of presenting virtual arrays to host systems, and to provide a way of centralizing array partitioning from another part of the system—for example, the fabric. It is also desirable to be able to migrate data from one such presented virtual array to another.

SUMMARY OF THE INVENTION

In accordance with the principles of the invention, there are provided apparatus, methods, and program products for migrating data between virtual arrays. Accordingly, there is provided a plurality of groups of logical units of storage. At least one physical port is coupled to the groups through which the groups can be coupled to a fabric. Each group is assigned a unique virtual port address for each physical port to which it is coupled. A first group comprises a source virtual array. The source virtual array has at least one source virtual port coupled to the fabric, each source virtual port having a source virtual port name and a source virtual port address. A second group comprises a destination virtual array. The destination virtual array has one or more destination virtual ports coupled to the fabric, each destination virtual port having a destination virtual port name and a destination virtual port address. All data resident on the source virtual array is copied to the destination virtual array. The destination virtual port names are then replaced with the source virtual port names so that the destination virtual port has the source virtual port name. The fabric then updates its name server database for use by the host(s) so that the database associates the source virtual port name with the destination virtual port address and the destination virtual port name with the source virtual port address.

Furthermore, the source virtual array includes source LUNs for use by the host(s), each source LUN having a source LUN name and source LUN number. The destination virtual array includes destination LUNs for use by the hosts, each destination LUN having a destination LUN name and a destination LUN number. The destination LUN names are replaced with the source LUN names so that the destination LUNs have the source LUN names. Destination LUN numbers are replaced by source LUN numbers in the same manner.

In accordance with another embodiment, source and destination virtual port names and LUN names and numbers may be exchanged between source and destination virtual array, so that after the exchanged virtual port names and LUN names and numbers are enabled, the source and destination virtual arrays appear to have swapped places.

By replacing or exchanging virtual port names and LUN names and numbers, a source virtual array is migrated to a destination virtual array in a manner transparent to the hosts and applications.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 5 is a representation of a LUN table in a host.

FIG. 8 is a representation of the name table in the switch in accordance with the invention.

FIG. 12A is a representation of a LUN table in one host when the zoning table in the switch is operational.

FIG. 12B is a representation of a LUN table in a second host when the zoning table in the switch is operational.

FIG. 15 is a representation of the database server name table in the switch of FIG. 14.

FIG. 16 is a representation of a LUN table in a host of FIG. 14.

FIG. 18 is a representation of the database name server table in the switch after virtual port names have been exchanged between the source and destination virtual arrays in accordance with the invention.

FIG. 19 is a representation of the LUN table in a host after LUN name and number tables have been exchanged between the source and destination virtual arrays in accordance with the invention.

DETAILED DESCRIPTION OF EXEMPLARY EMBODIMENTS

Figure 1:
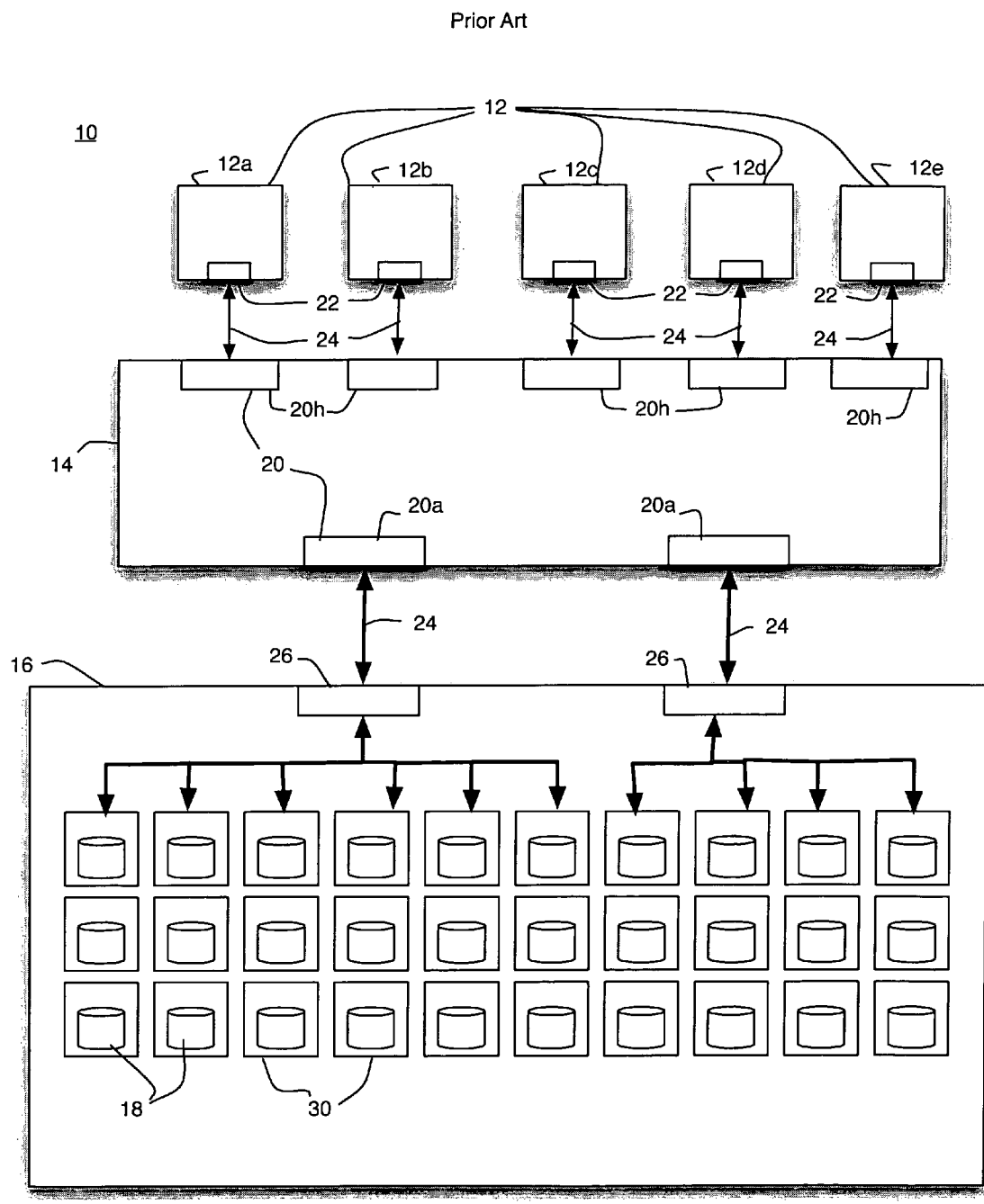
FIG. 1 is a representation of a storage area network. The storage area network includes a Fibre Channel array and hosts coupled to a Fibre Channel fabric switch.

In FIG. 1 there is shown a functional block diagram of an exemplary storage area network 10 in which the invention can be implemented. The storage area network 10 employs a Fibre Channel fabric topology. Fibre Channel is a high speed serial transport used in storage systems. It is described in a series of standards that can be found at *X3T9.3 Task Group of ANSI: Fibre Channel Physical and Signaling Interface (FC-PH)*, Rev. 4.2 Oct. 8, 1993. Hosts 12, shown individually as 12a, 12b, 12c, 12d and 12e are coupled to a Fibre Channel "fabric" in the storage system, herein shown as a switch 14. A storage array 16 including disk drives 18 is also coupled to the switch 14. The hosts 12 communicate with the disk drives 18 via a cross-point Fibre Channel connection through the switch 14.

The switch 14 includes switch ports 20. Host facing switch ports are labeled as 20h. Array facing switch ports are labeled as 20a. Host ports 22 on the hosts are coupled via Fibre Channel links 24 to host-facing switch ports 20h on the switch 14. Physical array ports 26 on the array 16 are coupled via Fibre Channel links 24 to array-facing switch ports 20a on the switch 14. The disks 18 within the array 16 are organized into logical units ("LUNs") 30. "LUN", originally a SCSI (small computer system interface) term, is now commonly used to describe a logical unit of physical storage space. The LUNs are exported by the array ports 26 for access by the hosts 12 via the Fibre Channel links 24 and switch 14. As herein shown, each disk appears to be configured as a separate LUN, though it is understood that a LUN can encompass part of a disk, or parts of multiple disks, or multiple complete disks. The arrangement shown is chosen for convenience of description.

In a Fibre Channel system such as that of FIG. 1, each Fibre Channel device (including but not limited to host ports and array ports) has two identifying characteristics—a name and an address. Fibre Channel names, known as "world wide names", are unique—every Fibre Channel device in the world has its own unique name. Each Fibre Channel device in a system also has an address, referred to in Fibre Channel parlance as an "ID", that is dynamic and dependent upon the configuration of the system. The IDs are used for directing information between hosts and arrays in the system. Port addresses are commonly referred to as "port IDs". LUN addresses are commonly referred to as "LUN numbers". After initialization, the hosts 12 communicate with the array ports 26 and LUNs 30 by sending messages to the appropriate port ID and LUN number. The hosts adapt to new addresses, but devices in use must maintain the same name in order for uninterrupted communications to continue.

Figure 2:
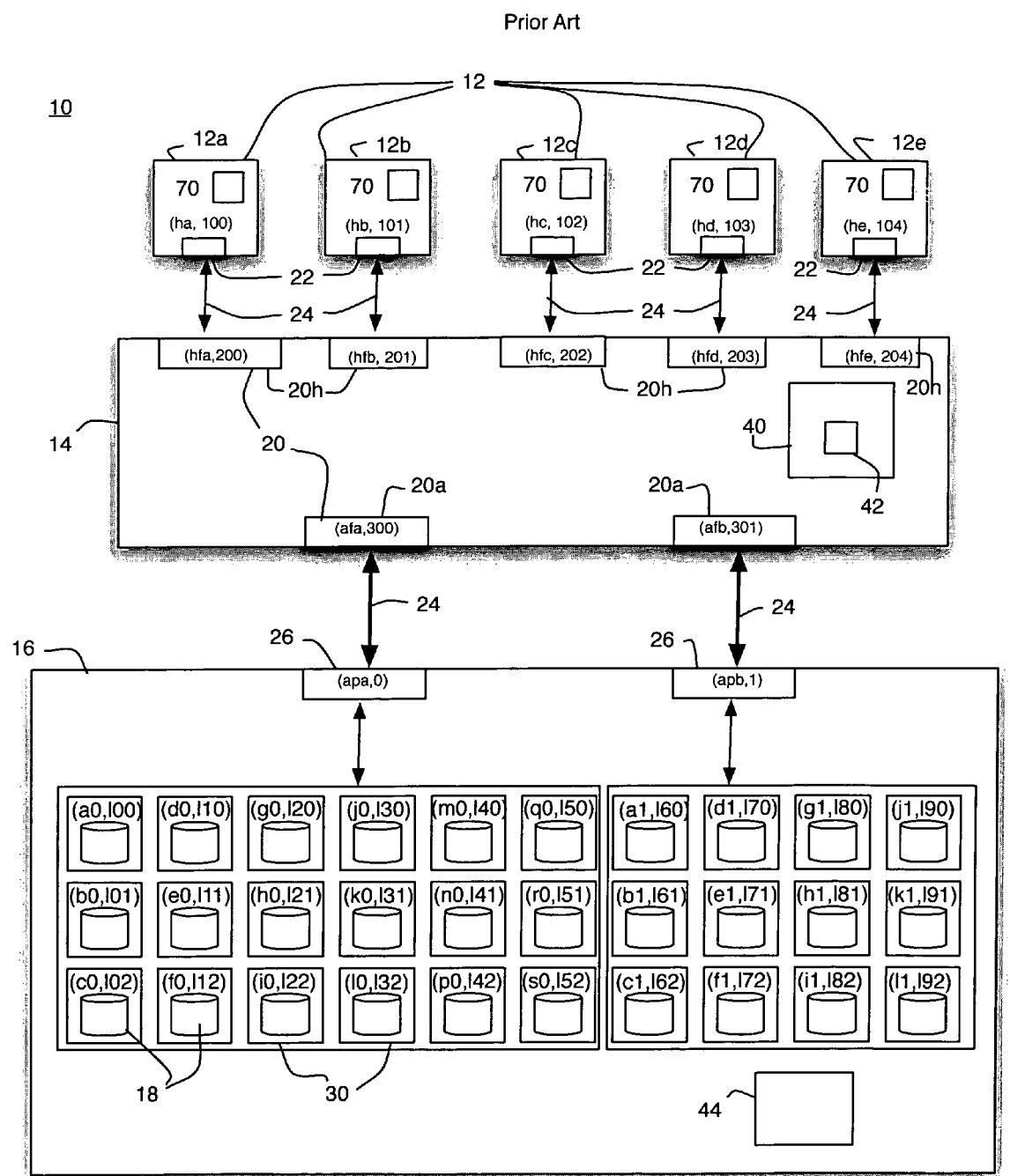
FIG. 2 is a representation of the storage area network of FIG. 1, showing Fibre Channel port IDs and LUN names and numbers.

In a Fabric topology, the switch 14 assigns IDs to the host ports 22 and array ports 26 during initialization. IDs as described in the Fibre Channel specification are actually 24 bit quantities containing several fields. In FIG. 2 names and IDs are shown symbolically with alphanumeric symbols for simplicity of explanation. The names and IDs of each port and LUN are shown as a pair (name, ID). For instance, the host port 22 on the host 12a is shown to have a name and ID of (ha, 100). The names and IDs for the ports 22 on the hosts 12b-e are (hb, 101), (hc, 102), (hd, 103) and (he, 104). The host-facing switch ports 20h are shown to have names and IDs (hfa, 200), (hfb, 201), (hfc, 202), (hfd, 203), and (hfe, 204). Array-facing switch ports 20h are shown to have names and IDs (afa, 300) and (afb, 301). The array ports 26 are shown to have names and IDs (apa, 0), and (apb, 1). Each LUN 30 has a name and LUN number. For example, the LUN of name a0 is LUN number L00. LUN numbers L00, L01, L02, L10, L11, L12, L20, L21, L22, L30, L31, L32, L40, L41, L42, L50, L51, AND L52 are shown as accessible via array port ID 0. LUN numbers L60, L61, L62, L70, L71, L72, L80, L81, L82, L90, L91, and L92 are shown as accessible via array port ID 1.

Figure 3A:
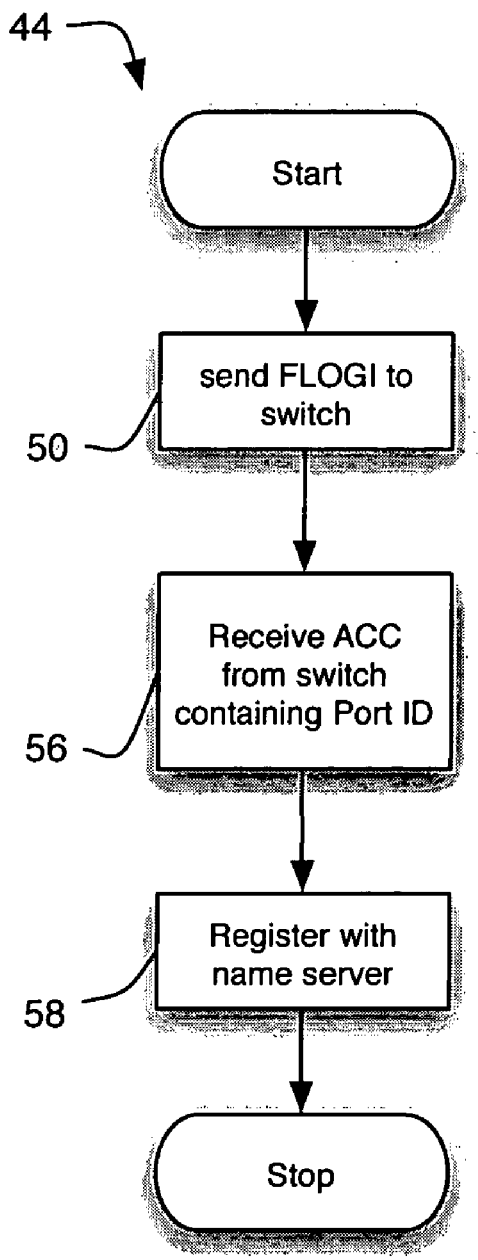
FIG. 3A is a flow diagram representing the operation of the array controller during Fibre Channel system initialization.
Figure 3B:
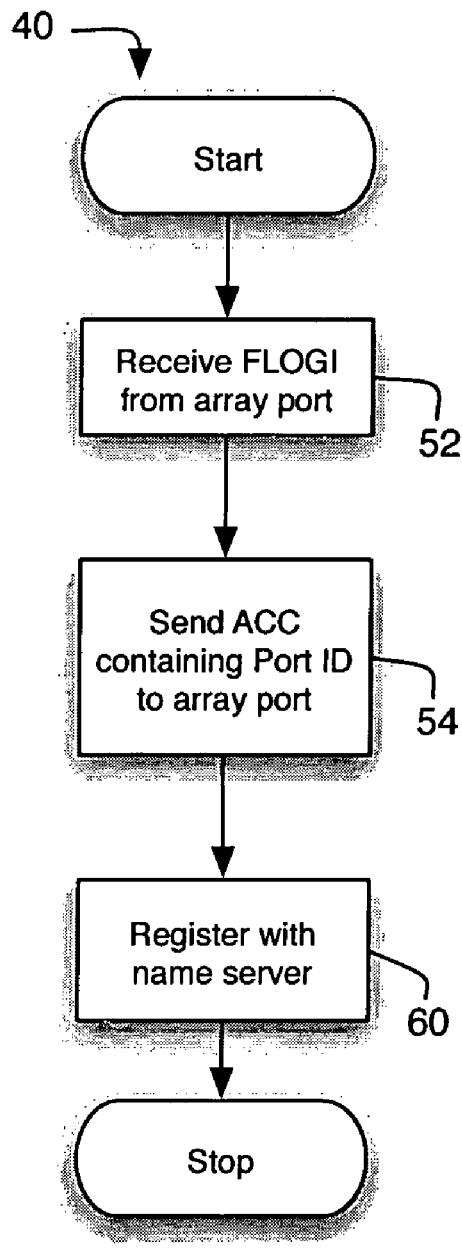
FIG. 3B is a flow diagram representing the operation of the switch during Fibre Channel system initialization.

The Fibre Channel switch 14 includes a name server database 40. The name server database 40 is used by the switch 14 to assign IDs to host ports 22 and array ports 26 during initialization. The name server database 40 includes a name server table 42 that is used by the switch to resolve IDs to names. The general process by which port IDs are assigned in accordance with the ANSI T11 Fibre Channel standards is shown in FIGS. 3A and 3B. FIG. 3A shows the process by which the switch 14 assigns Port IDs. FIG. 3B shows the process by which the Fibre Channel array controller 44 in the array 16 (FIG. 2) communicates with the switch 14. First, for each array port (i.e. ports 0 and 1), the array controller 44 sends a port login "FLOGI" command to the switch 14 containing the array port name (FIG. 3A step 50). The port logins are received by the switch 14 (FIG. 3B step 52). When the switch 14 receives a port login command, it responds by sending an acknowledgement message to the array controller 44 (FIG. 3B step 54). This acknowledgement message contains a Port ID for the array port that was logged in. The acknowledgement message is received by the array controller 44 (FIG. 3A step 56). Then, a registration process is performed by the switch 14 (FIG. 3A step 58, FIG. 3B step 60). During the registration process, the name server table 42 containing port names and their corresponding port IDs is built and distributed to nodes registered to receive it.

Figure 4:
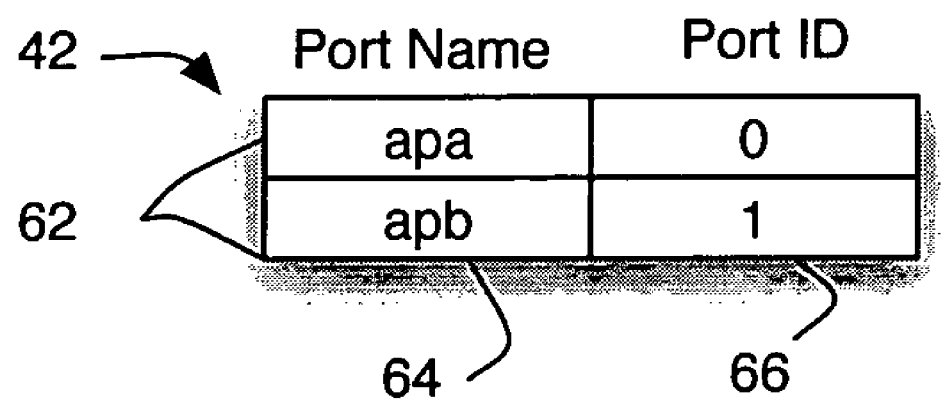
FIG. 4 is a representation of a name table managed by the name server database in the switch.

An example of the name server table 42 is shown in FIG. 4. The full contents of the name server table 42 are described in the Fibre Channel Name Server MIB, described in the IETF RFC 4044, "Fibre Channel Management MIB", herein incorporated by reference. FIG. 3 shows only enough of the table 42 to contribute to understanding of the invention. The table 42 includes multiple entries 62, each including a port name field 64 and a port address ID field 66. During the registration process of FIGS. 3A and 3B, the entries 62 are populated with the switch port 26 names and Port IDs assigned by the switch 14. For the example array 16 shown in FIG. 1, an entry 44 includes the port name apa and Port ID 0, while another entry 62 includes the port name apb and Port ID 1. The switch 14 then sends this table 42 to all members of the SAN 10 registered to receive state change notifications. This includes the hosts 12. The hosts 12 now have the Port IDs of the array ports 26 so Fibre Channel communications between the hosts 12 and array 16 can ensue.

Now that the hosts have IDs to access the ports, they can learn what LUNs are available. LUN names and numbers are managed at the array level. Each host 12 sends a query to each array port 26 ID in turn, requesting a list of available LUN numbers. Once the LUN numbers for a given array port ID are known, the host 12 is able to query each LUN 30 by using a combination of the port ID and LUN number to access the LUNs 30. The host 12 then queries each LUN 30 for its corresponding LUN name. Once the host has gathered all this information, it builds a directory LUN table 70 that relates LUN names, port IDs, and LUN numbers. A representation of such a LUN table 70 is shown in FIG. 5. The table includes an entry 72 for each LUN it has discovered. Each entry includes a LUN name field 74, a port ID field 76 and a LUN number field 78, which in combination identify the LUN 30. The table 70 for a host 12 of FIG. 2 includes the LUN names, port IDs, and LUN numbers for the LUNs 30 on the array 16 for each port ID 0 and 1. For example, one entry 72 shows a LUN with name a0 and LUN number L00 associated with Port ID 0. Another entry 72 shows a LUN with name k0 and address L31 associated with Port ID 0. Yet another entry 72 shows a LUN with name e1 and LUN number L71 associated with Port ID 1.

During operation, hosts 12 refer to LUNs 30 by their LUN numbers. In order to access a LUN 30, a host 12 port 22 sends a message whose Fibre Channel address includes the array port ID and LUN number. The switch 14 parses the port ID portion of the address in order to forward the message to the identified array port 26. The array 16 then uses the LUN number portion of the address to access the proper LUN 30 within the array 16. So, for example, if host 12a needs to access LUN #L71, the host 12a port 22 sends a message to an address including the port ID 1 and the LUN number L71. The switch 14 sees the port ID 1 and sends the message to the array port 26 with ID 1. The array sees that the message is directed to LUN # L71 and thus proceeds to perform the appropriate operation on LUN #L71.

Note that, in accordance with the prior art arrangement of FIG. 2, a host has actual access to all LUNs on each array port to which it has access. For example, the host 12a has access to port ID 0, and therefore has access to LUNs L00-L52.

It is often desirable to separate a storage array into several distinctly accessible sub-arrays, or "virtual arrays". Each host or application has access to a virtual array, but does not have access to the other virtual arrays within the storage array. For example, it may be desirable to arrange the LUN numbers L00-L12 as a first virtual array accessible only to the host 12a, and LUN numbers L20-L32 as a second virtual array accessible only to the host 12b. Such an arrangement can provide security against data corruption and can provide ease of management for host applications. But, in the prior art example of FIG. 2, all the LUNs L00-L52 are exposed via the same port ID 0, and thus cannot be hidden at the fabric level from either host 12a or host 12b. Virtual arrays have therefore previously been provided only through implementation of complex software on the storage array.

In accordance with the principles of the invention, the storage array and fabric are employed to present virtual arrays to the hosts. The LUNs in a storage array 16 are arranged into several storage groups. The term "storage group" can have different meanings in different contexts. For example, a "storage group" in prior art software based virtual arrays includes a host and a set of LUNs. For clarity, a "storage group" as used herein is simply a group of LUNs. Virtual Port IDs are established over each physical port on the array. Each storage group has assigned to it at least one virtual port ID, used by the hosts to access the storage groups. Each storage group is thus separately accessible via at least one unique virtual port ID. A host 12 can access only the LUNs 30 in a storage group with a virtual port ID to which the switch 14 allows it access. As will be seen, the provision of unique virtual IDs for each storage group allows zoning to be applied by the switch 14 such that each host 12 has access to only designated storage groups. The storage groups thus appear as individual virtual arrays to the hosts 12. Therefore, the storage groups will herein further be referred to as "presented virtual arrays".

Figure 6:
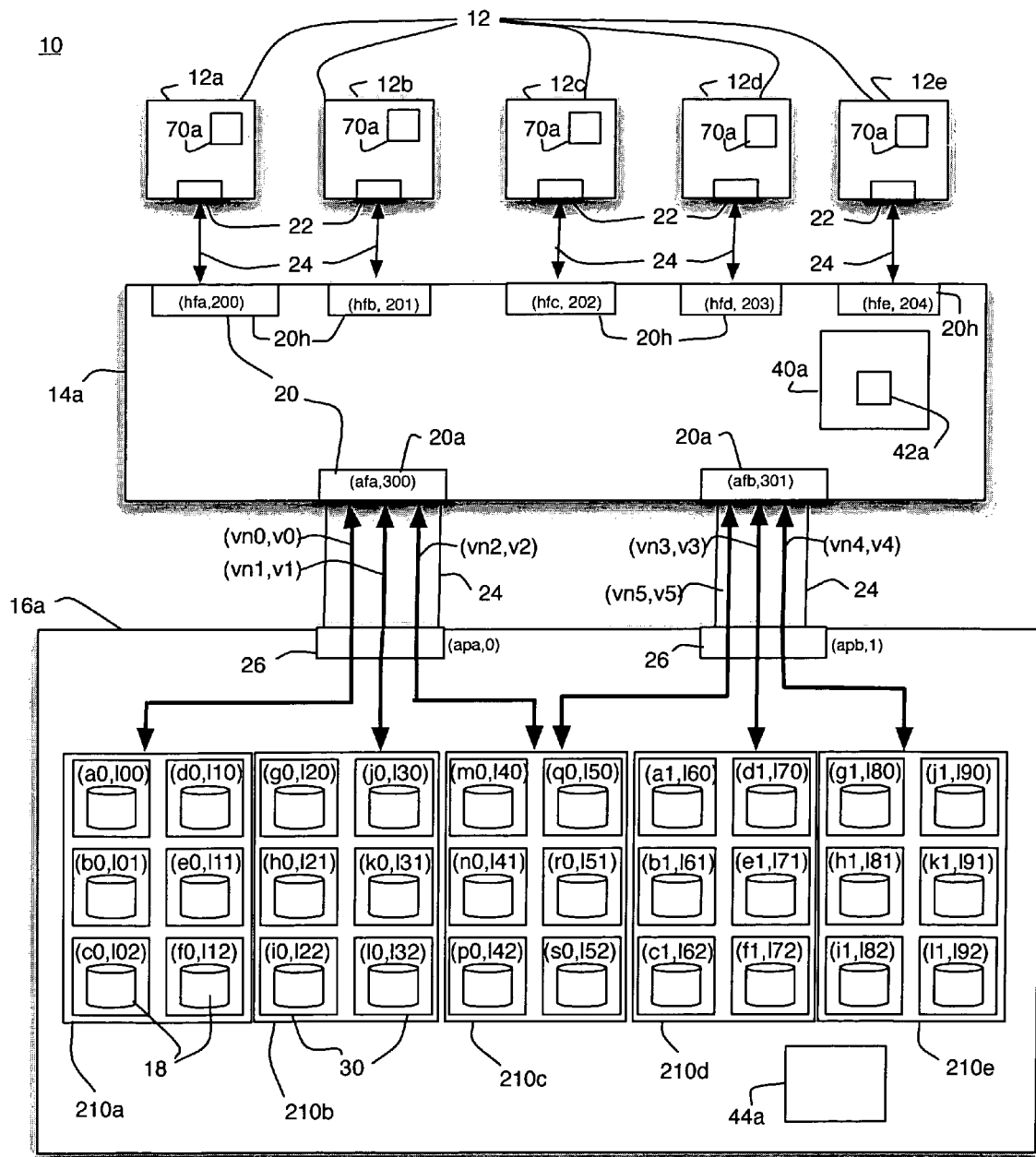
FIG. 6 is a representation of a storage area network wherein the LUNs in the storage array are arranged into groups and are separately addressable via virtual port IDs in accordance with the invention.

In FIG. 6, the storage system 10 has been modified so that presented virtual arrays can be accessed by the hosts. The modified storage array 16a is shown to include presented virtual arrays 210a, 210b, 210c, 210d, and 210e. The storage groups forming the presented virtual arrays can be arranged for example by a modified Fibre Channel controller 44a (shown) or by a separate controller, or by pre-configured software programming or dynamic user programming of the array 16, or any combination thereof. Each presented virtual array 210a-210e is associated with at least one "virtual port ID" v0-v5. Generally, each presented virtual array 210a-210e is assigned one or more virtual port IDs depending upon how many physical ports the virtual array is accessible through. As shown by example, the presented virtual array 210a is associated with the physical array Port ID 0 and is assigned one virtual port ID v0. The presented virtual array 210b is also associated with the physical array Port ID 0 and is assigned one virtual port ID v1. The presented virtual array 210c is associated with both the physical array ports Port ID 0, 1, and is thus assigned two virtual port IDs v2 and v5. The presented virtual arrays 210d and 210e are both associated with the physical array port ID 1 and are assigned virtual port IDs v3 and v4 respectively.

Figures 7A, 7B:
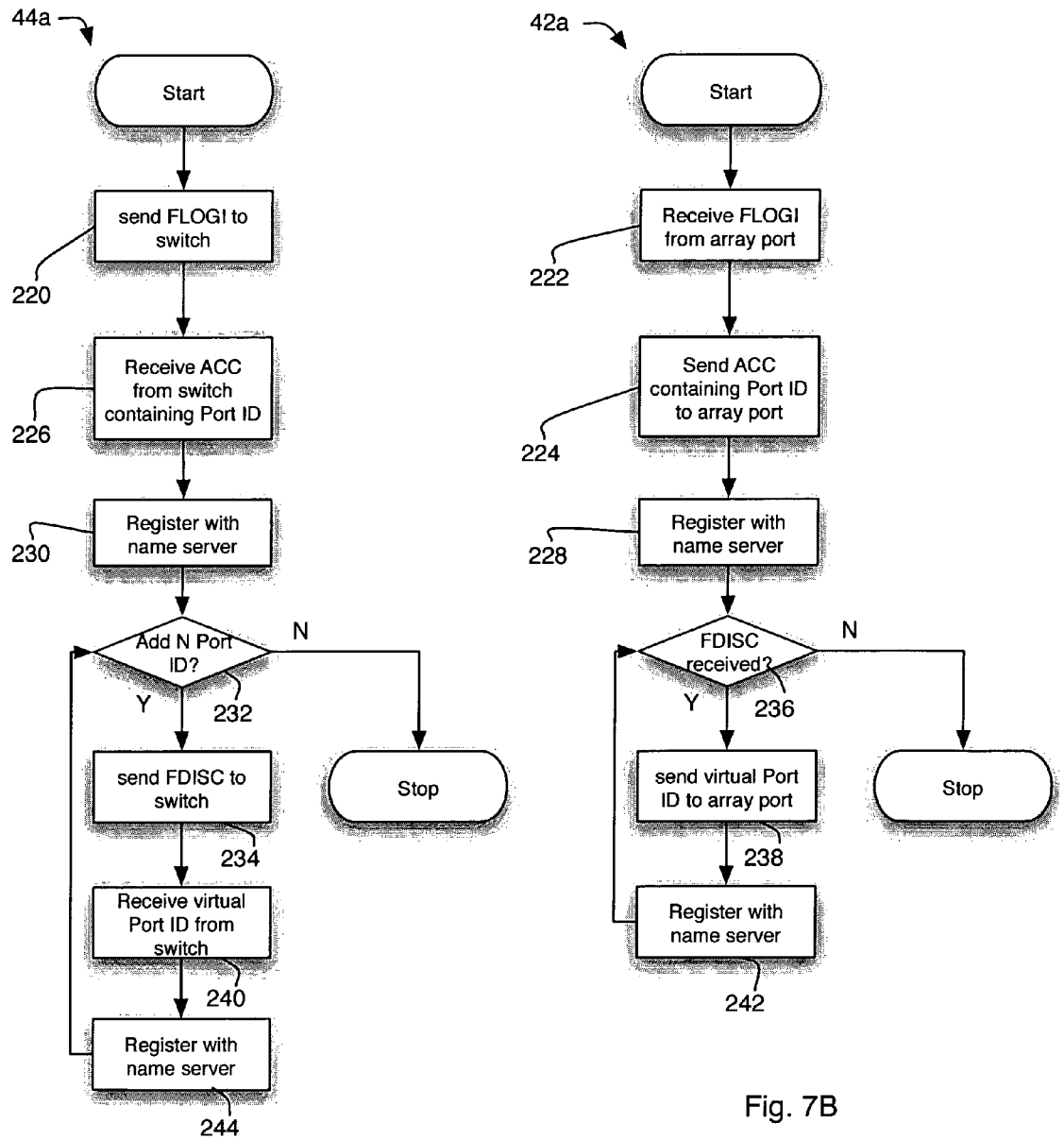
FIG. 7A is a flow diagram representing the operation of the array controller during Fibre Channel system initialization when virtual port IDs are implemented on the storage array.
FIG. 7B is a flow diagram representing the operation of the switch during Fibre Channel system initialization when virtual port IDs are implemented on the storage array.

In accordance with one implementation of the virtual Port IDs of the invention, the virtual port IDs are assigned by the modified switch 14a. The ANSI T11 Fibre Channel standards, which currently define Fibre Channel virtual ports used by hosts, is extended to support storage arrays. The process by which virtual Port IDs are provided by the switch 14a is shown in FIGS. 7A and 7B. FIG. 7A shows the process by which the Fibre Channel array controller 44a in the array 16 communicates with the switch 14a. FIG. 7B shows the process by which the switch 14a assigns Port IDs. First, each array port (i.e. ports 0 and 1) logs in to the switch 14a by sending an FLOGI command containing its port name to the array controller 44a (FIG. 7A step 220). The port logins are received by the switch 14a (FIG. 7B step 222.) When the switch 14a receives a port login ("FLOGI") command, it responds by sending an acknowledgement message to the array controller 44a (FIG. 7B step 224). This acknowledgement message contains a Port ID for the array port that logged in. The acknowledgement message is received by the array 16 controller 44a (FIG. 7A step 226). Then, a registration process is performed by the switch 14a (FIG. 7A step 228, FIG. 7B step 230). During the registration process, the name server table 42a is built as previously described with regard to name server table 42.

Then, if virtual port IDs are needed by the array 16a ports 26 (step 232), the array controller 44a sends an "FDISC" command containing a virtual port name to the switch 14a (step 234). The switch 14a receives the FDISC command (step 236) and responds by sending a virtual port ID to the array controller 44a (step 238). The array controller 44a receives the virtual port ID from the switch 14a (step 240). The switch 14a and array controller 44a then perform the registration process to add the virtual Port name and ID to the name server table 42a, as will be described (steps 242, 244). The FDISC command and response is repeated for each virtual ID required for each physical port (steps 232-244).

Now the switch 14a can build the name server table 42a in a manner similar to that previously described with respect to name server table 42, except the name server table 42a associates multiple virtual port IDs with the physical port names. An example of such a name server table 42a is shown in FIG. 8. The physical array port 26 with name apa and Port ID 0 is also associated with the virtual port names and IDs (vn0,v0), (vn1,v1), and (vn2,v2). Likewise, the physical array port 26 with name apb and Port ID 1 is associated with the virtual port names and IDs (vn3,v3), (vn4,v4), and (vn5,v5). At this point, the switch 14a can update the hosts 12 with the contents of the name server table 42a as previously described. The hosts 12 will thereby receive all the virtual port IDs v0-v5.

Figure 9:
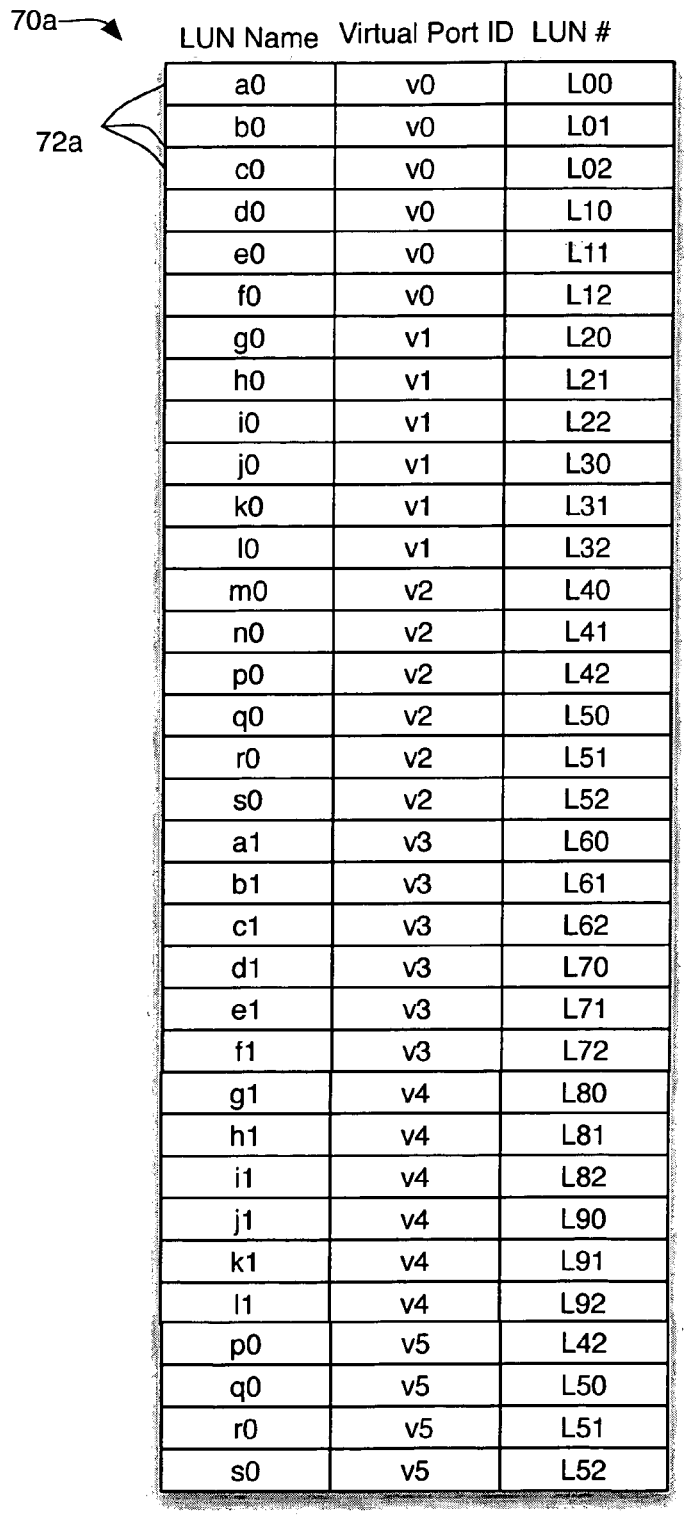
FIG. 9 is a representation of a LUN table in a host in accordance with the invention.

Now that the hosts 12 have the virtual port IDs v0-v5, they can build their directory LUN tables in a manner similar to that previously described with regard to FIG. 5, except that now each virtual port ID will be associated with LUN names and numbers. Accordingly, each host 12 sends a query to each virtual array port ID v0-v5 in turn, requesting a list of available LUN numbers. Once the LUN numbers for a given virtual array port ID are known, the host is able to query each LUN 30 by using a combination of the virtual port ID and LUN number to access the LUNs. The host 12 then queries each LUN 30 for its corresponding LUN name. Once the host has gathered all this information, it builds a directory LUN table 50a that relates LUN names, virtual port IDs, and LUN numbers. A representation of such a LUN table 70a is shown in FIG. 9. The table includes an entry 72a for each LUN it has discovered. Each entry includes a LUN name field 74a, a virtual port ID field 76a and a LUN number field 78a, which in combination identify the LUN. For example, the LUNs 30 associated with the presented virtual array 210a—i.e. virtual port ID v0—are (a0, L00), (b0, L01), (c0, L02), (d0, L10), (e0, L11), and (f0, L12). Note also that the presented virtual array 210c (LUN#s L40-L52) is dual-ported; that is, it is accessible via virtual port IDs v2 and v5. LUNs in dual-ported presented virtual arrays may have two separate LUN numbers as well, one for use when accessed on the first virtual port ID, and the second for use when accessed on the second virtual port ID. Dual-ported presented virtual arrays can be useful for high availability purposes.

In accordance with one advantage of the invention, storage array "zoning" can be implemented at the fabric switch in order to physically separate the presented virtual arrays for access only by certain hosts. Fibre Channel switches are able to implement zoning, whereby access between host ports and array ports is specified. But zoning can only be implemented at the port level; that is, it cannot be implemented at the LUN level. In the prior art arrangement of FIG. 2, zoning cannot be used to separate the storage groups of LUNs 210a, 210b, 210c as shown FIG. 3, because all the LUNs have the same Port ID 0.

But in accordance with this further aspect of the invention, since each presented virtual array 210a-e is associated with its own unique virtual Port ID v0-v5, the switch 14a can differentiate between each presented virtual array 210a-e based upon its virtual Port ID. The switch 14a can be programmed to allow or disallow access to each virtual port address from each host facing array port address through the use of its zoning process. Host access to the presented virtual arrays 210a-e can thus be physically separated, enhancing security, data integrity, and ease of storage management for host applications.

Figure 10:
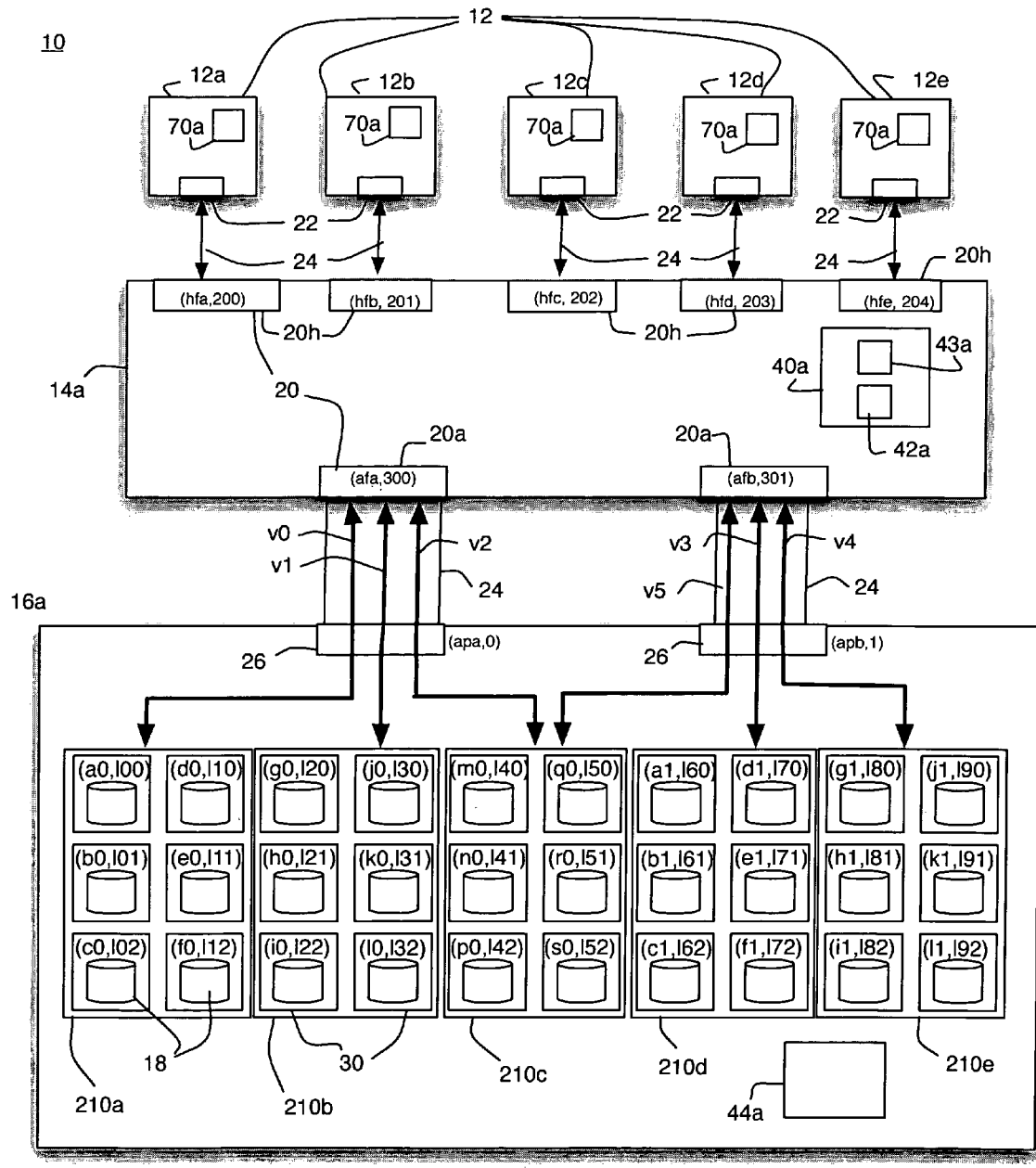
FIG. 10 is a representation of the system of FIG. 6 wherein the name server database in the switch further includes a zoning table.
Figure 11:
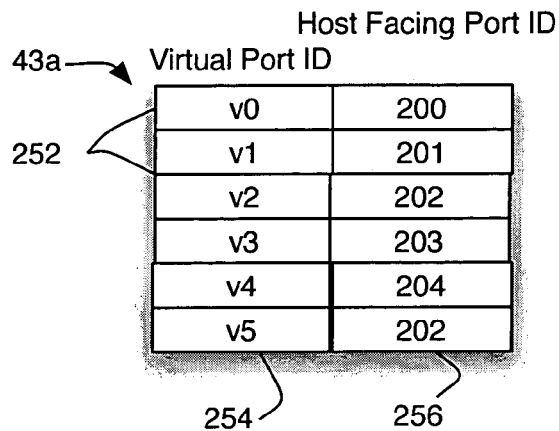
FIG. 11 is a representation of the zoning table of FIG. 10.

Referring now to FIG. 10, the switch name server database 40a is shown to include a zoning table 43a as well as a name table 42a. The full contents of a zoning table as used by a prior art Fibre Channel switch is described at FC-GS-3. The zoning table 43a is modified in accordance with the invention to include virtual array port IDs. The zoning table 43a is shown in FIG. 11. Only the portions of the zoning table 43a relevant to an understanding of the invention are shown here. Accordingly, the zoning table 43a has entries 252 including a virtual port ID field 254 and a host facing switch port ID field 256. For each virtual port ID recognized by the switch 14, the name server database 40a can associate one or more host facing switch port IDs with the virtual port ID. For example, in the table shown, virtual port ID v0 is associated with host facing switch port ID 200. Virtual port ID v1 is associated with host facing switch port ID 201. Virtual port ID v2 is associated with host facing switch port ID 202. Virtual port ID v4 is associated with host facing switch port ID 204. Virtual port ID v5 is associated with host facing switch port ID 202. (Host facing array port 202 is dual ported on virtual port IDs v2 and v5.)

Figure 13:
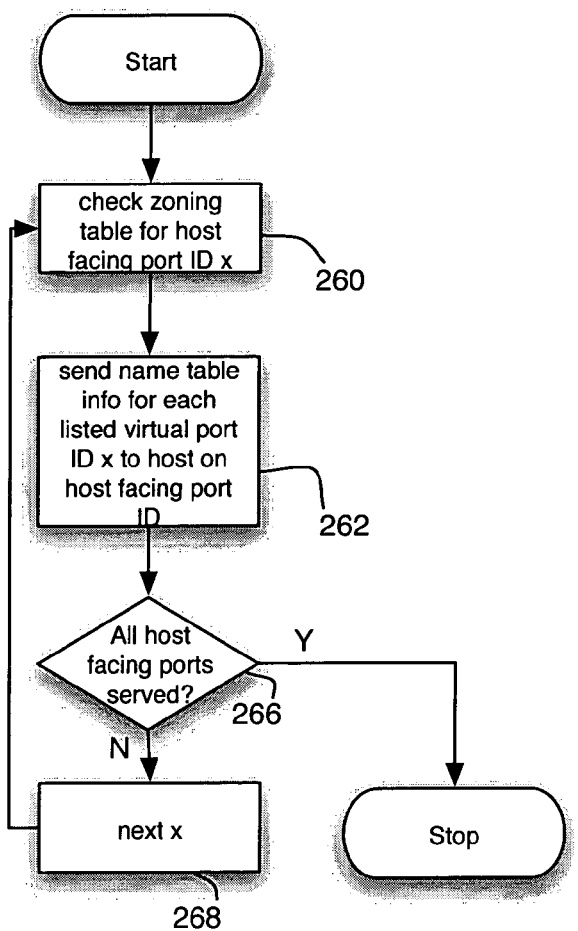
FIG. 13 is a flow diagram representing the operation of the switch when a zoning table is in use.

Now, when the switch 14a updates the hosts 12 with the contents of the name server table 42a, it uses the zoning table 43a to filter the presentation of the name server table 42a information to the hosts 12. Referring to FIG. 12 there are shown several examples of the LUN tables 70a in the hosts 12a and 12b. When the switch 14a updates the hosts 12, the switch 14a refers to the zoning table 43a—for example the table of FIG. 11. The process by which the switch 14a uses the zoning table 43a is shown in FIG. 13. The switch 14a checks the zoning table 43a for the first host facing port ID 200 (step 260). The switch 14a sees that the host facing array port ID 200 is authorized to access only virtual array port v0. So, only the name table information associated with virtual port ID 0 is forwarded to the host 12a that is coupled to the host facing switch port ID 200 (step 262). The host 12a thus receives the address information for the virtual port v0. The LUN table 70a for the host 12a thus looks like that shown in FIG. 12A. The host 12a is limited to access to the LUNs L00-L12 on virtual Port ID v0. The switch 14a then checks the zoning table 43a for access information for the host facing switch port ID 201 (steps 266, 268, 260). The switch 14a sees that the host facing switch port ID 201 is authorized to access only virtual array port v1. So, only the name table information associated with virtual array port v1 is forwarded to the host 12b that is coupled to the host facing switch port ID 201 (step 262). The host 12b thus receives the address information for the virtual port v1. The LUN table 70a for the host 12b thus looks like that shown in FIG. 12B. The host 12b is limited to access to the LUNs L20-L32 on virtual Port ID v1. This process continues for each host facing switch port ID (steps 266-262).

Now each host has access to only the LUNs 30 on the virtual array ports allowed by the zoning table 43a in the switch 14, rather than to all LUNs 30 on a physical array port 26. The invention thus allows a very simple and efficient means of presenting virtual arrays to the hosts, without requiring complex array level software.

In accordance with a further aspect of the invention, a presented virtual array can be migrated to another virtual array. Consider for example that a host application uses one presented virtual array on a physical array for one application, such as e-mail, and another presented virtual array on the physical array for another application, such as work-related databases. A user or organization might need to update or change the work-related databases while retaining the e-mail. The user or organization, however, needs to maintain the old work-related databases on-line. The user or organization would therefore like to migrate the presented virtual array containing the work-related database to another presented virtual array, possibly residing on a different physical array comprising less expensive storage, while keeping the presented virtual array containing the e-mail intact on the original physical array.

In accordance with the principles of the invention, all the data on one presented virtual array referred to as the source virtual array, is migrated to another presented virtual array referred to as the destination virtual array, in a manner transparent to the hosts 12 and any applications hosted thereon. The commonly assigned co-pending U.S. patent application Ser. No. 11/241,165, herein incorporated by reference, describes a host transparent mechanism for complete migration of data between physical arrays. The general methods described therein are herein modified in order to enable host transparent data migration between virtual arrays.

Figure 14:
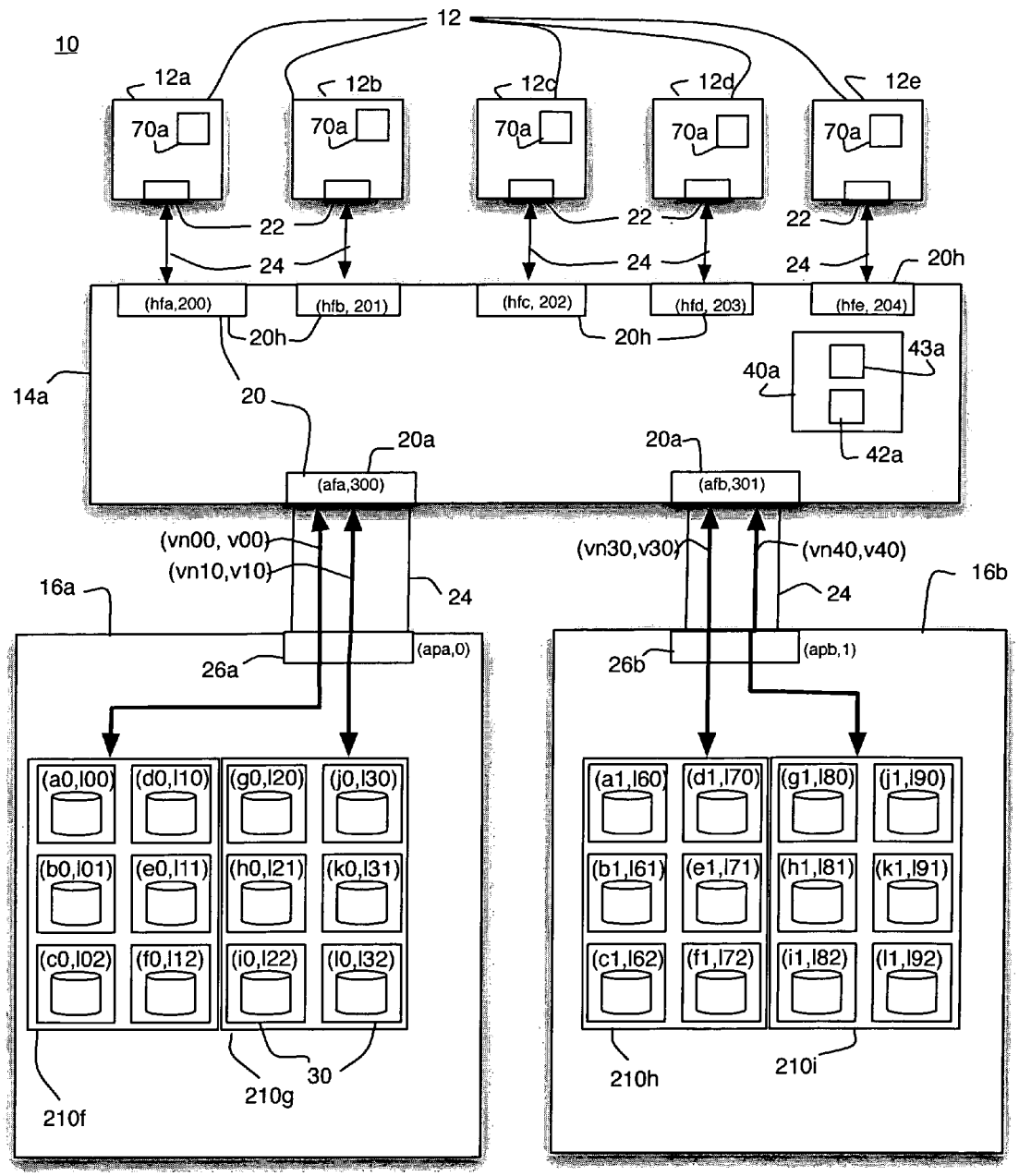
FIG. 14 is a representation of a storage area network including two physical storage arrays, each physical array presenting two virtual arrays.

Referring to FIG. 14, there is shown a system 10 including hosts 12, a switch 14a, and multiple physical arrays 16a and 16b. The system 10 is similar to the system 10 of FIG. 6, except that two physical arrays 16a and 16b are now shown. The switch 14a and physical arrays 16a and 16b are modified to support virtual array migration. The physical array 16a includes presented virtual arrays 210f and 210g, accessible via virtual port IDs v00 and v10 respectively over a physical array port 26a. The physical array 16b includes presented virtual arrays 210h and 210i, accessible via virtual port IDs v30 and v40 respectively over a physical array port 26b. All of the virtual arrays 210f, 210g, 210h, and 210i are established and operate as previously described with respect to FIGS. 6-13.

During system initialization, the switch 14a and each array 16a and 16b communicate as previously described with regard to FIGS. 7A and 7B in order to obtain Port IDs and virtual Port IDs. The resulting database server name table 42a is shown in FIG. 15. The database server name table 42a is uploaded to the hosts 12. Then, each host 12 builds a LUN table as previously described with regard to FIG. 9. An example of a LUN table built by the host 12a is shown in FIG. 16. This table assumes that zoning is not being implemented, and thus all LUNs and all virtual port IDs are visible to the host 12a. One skilled in the art will realize that the virtual array migration process to be described is equally applicable to systems in which zoning is enabled.

Now the process is described by which a source virtual array, for example virtual array 210f on physical array 16a, is migrated to a destination virtual array, for example virtual array 210i on physical array 16b. Migration of a virtual array can be handled in one of several ways. According to a first embodiment, the virtual port names and LUN names and numbers for the source virtual array 210f are exchanged with the virtual port names and LUN names and numbers for the destination virtual array 210i. According to a second embodiment, the virtual port names and LUN names and numbers of the destination virtual array 210i are replaced with the source virtual port names and LUN names and numbers of the source virtual array 210f.

Figure 17:
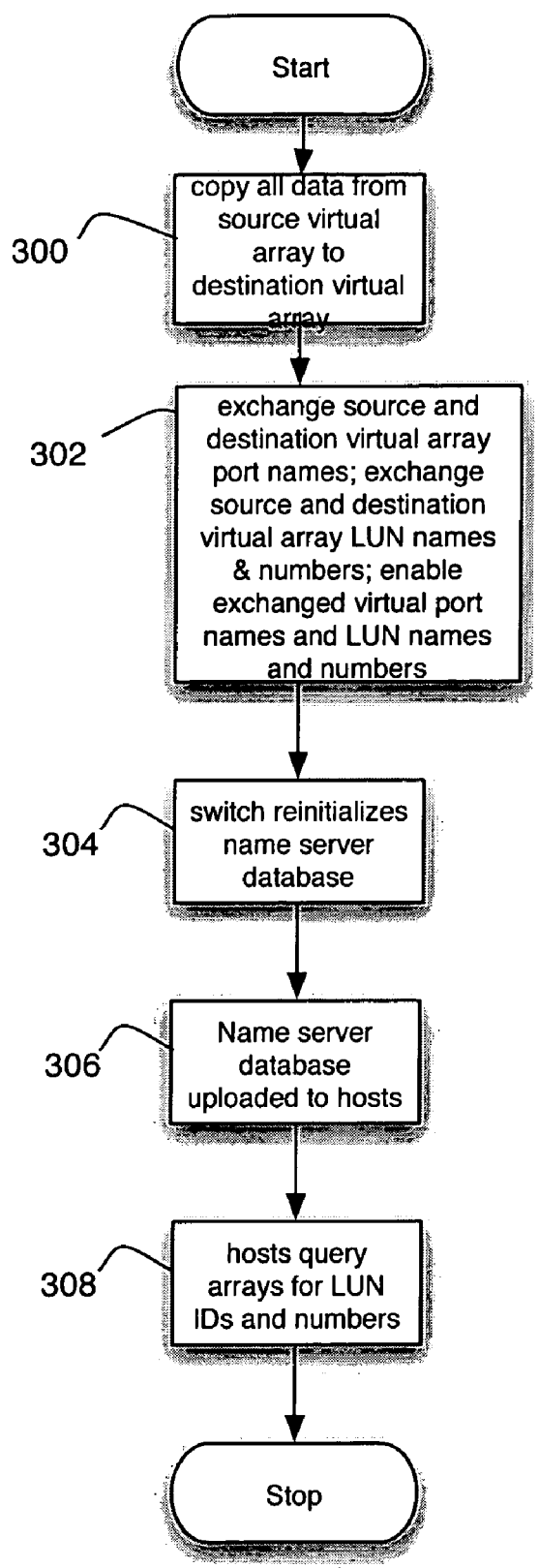
FIG. 17 is a flow diagram of the basic process by which a source virtual array is migrated to a destination virtual array in accordance with the invention.

The general process by which a migration occurs from the source virtual array 210f to the destination virtual array 210i in a manner transparent to the hosts 12 in accordance with the first embodiment is shown in FIG. 17. First, the data is copied from the source array 210f to the destination array 210i (step 300). Then, the virtual array port names for the source virtual array 210f are exchanged with the virtual port names for the destination virtual array 210i, and, the source virtual array 210f LUN names and numbers are exchanged with the destination virtual array 210i LUN names and numbers. The exchanged virtual port names and LUN names and numbers are then enabled (step 302). Once the virtual port name and LUN name and number exchanges are complete, the switch 14a notes the configuration change and updates its name server database 40a in response (step 304). The hosts upload the updated name server database 40a (step 306). The hosts then query the presented virtual arrays 210a,b for LUN IDs and LUN names (step 308). As will be shown, from the hosts' perspective, all the LUNs associated with the virtual array 210f that it was able to address previously remain continuously addressable, and no names have changed. In this manner, all the LUNs from the source virtual array 210f have been migrated to the destination virtual array 210i, in a manner transparent to the hosts 12.

FIG. 18 shows the contents of the name server table 42a after the virtual port names have been exchanged and translation tables enabled. The virtual port names have been swapped between the presented virtual arrays 120f and 120i so that virtual port name vn40 is now associated with virtual port ID v00, and virtual port name vn00 is now associated with virtual port ID v40. The updated name server database table 42a is uploaded to the hosts 12. The hosts 12 then query the arrays 16 for their LUN information.

FIG. 19 shows the contents of a LUN table 70a in the hosts 12a after the virtual port names and LUN names and numbers have been exchanged and translation tables enabled. The LUN numbers L00, L01, L02, L10, L11, and L12 now appear on virtual port ID v40, while the LUN numbers L80, L81, L82, L90, L91, and L92 now appear on virtual port ID v00.

Figure 20:
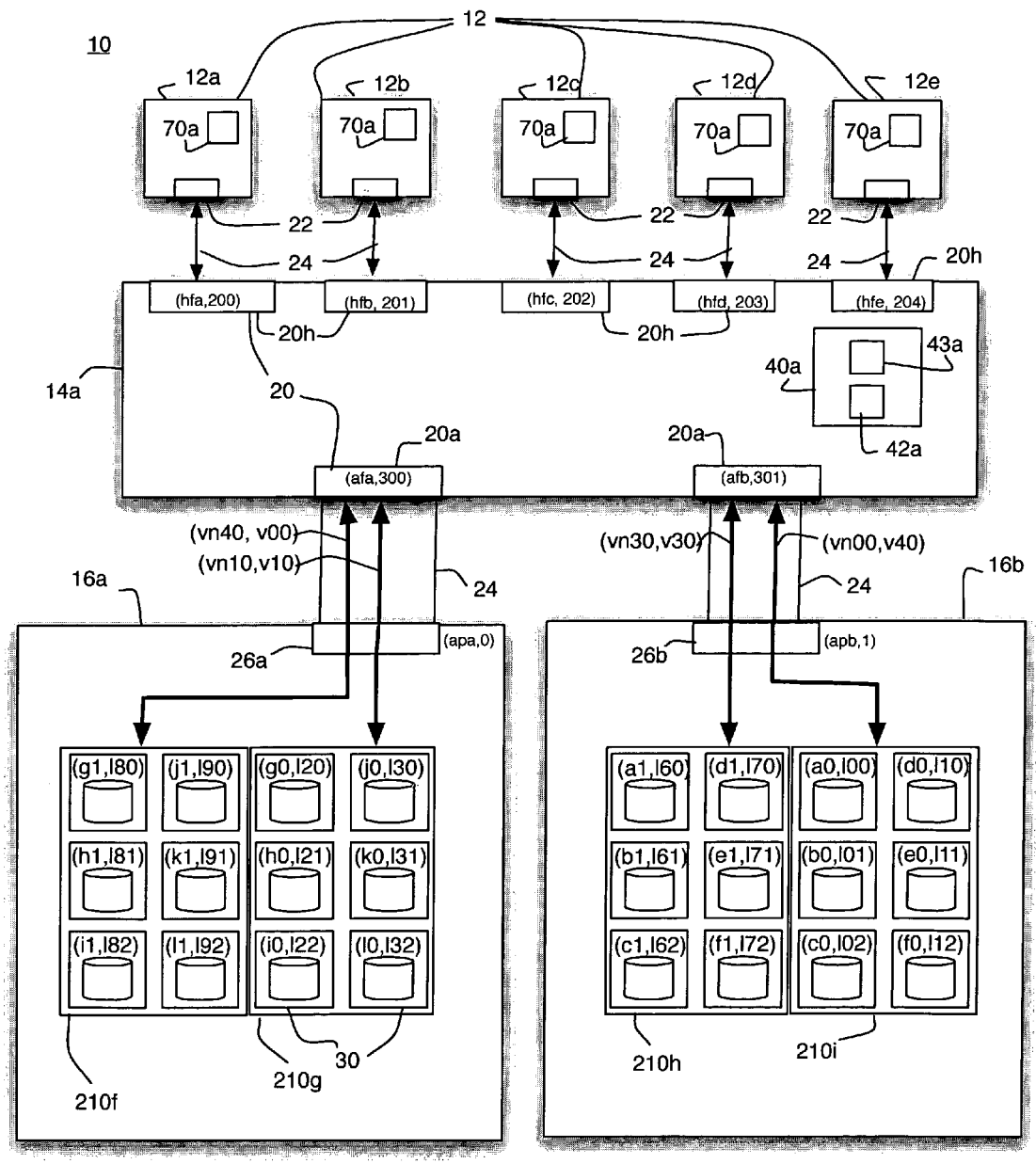
FIG. 20 is a representation of the storage area network of FIG. 14 after the source virtual array 120h is migrated to the destination virtual array 120i.

FIG. 20 shows the system of FIG. 14 after the migration. As can be seen, the presented virtual arrays 210f and 210i have been swapped so that LUN numbers L00, L01, L02, L10, L11, and L12 now appear on virtual port ID v40 on physical array 16b, and LUN numbers L80, L82, L82, L90, L91, and L92 now appear on virtual port ID v00 on physical array 16a. Now, from the hosts' perspective, though the virtual port IDs of the presented virtual arrays have changed, the presented virtual array port names and LUN names and numbers have not. It thus appears that the presented virtual arrays 210f and 210i have swapped places.

Figure 21:
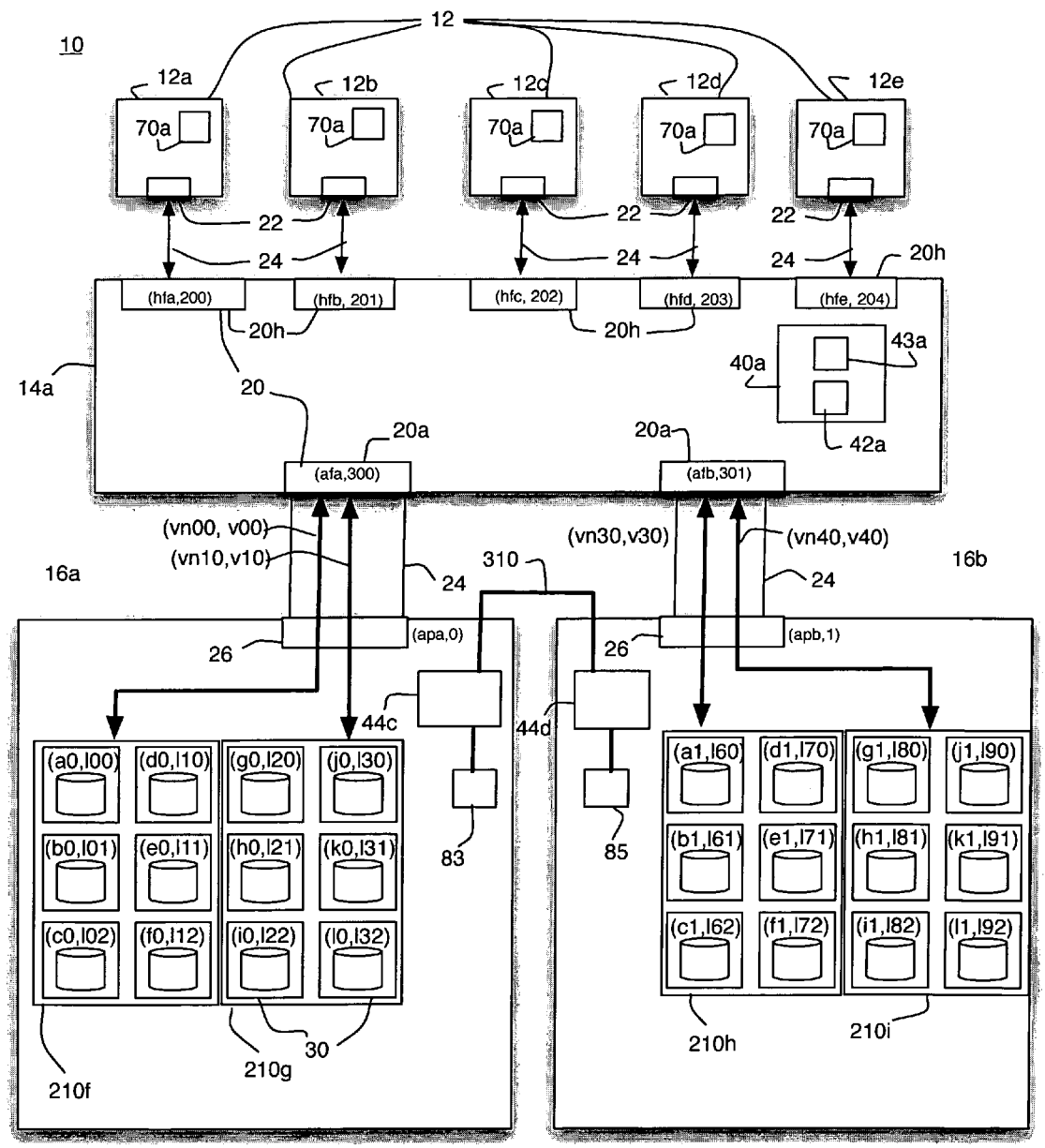
FIG. 21 is a representation of the storage area network of FIG. 14 further showing source and destination array controllers and translation tables.

An embodiment of the invention is now described in further detail. In FIG. 21, the source and destination arrays 16a and 16b are shown connected by a link 310. The link 310 can be any sort of connection between the arrays 16a and 16b over which they can communicate. Any type of I/O channel link or network link would suffice. This link could also pass through the switch 14. For purposes of simplicity, the link 310 is shown as a simple point-to-point connection between the arrays 16a and 16b. The link 310 is used for transferring copy data and messages between the arrays 16a and 16b. The source array 16a includes a source array controller 44c. The destination array 16b includes a destination array controller 44d. The array controllers 44c and 44d include the functionality of the array controller 44a of FIG. 6 and further include the logic necessary to enable migration of presented virtual arrays. The source array controller 44c is coupled to translation tables 83. The destination array controller 44d is coupled to translation tables 85.

Figure 22:
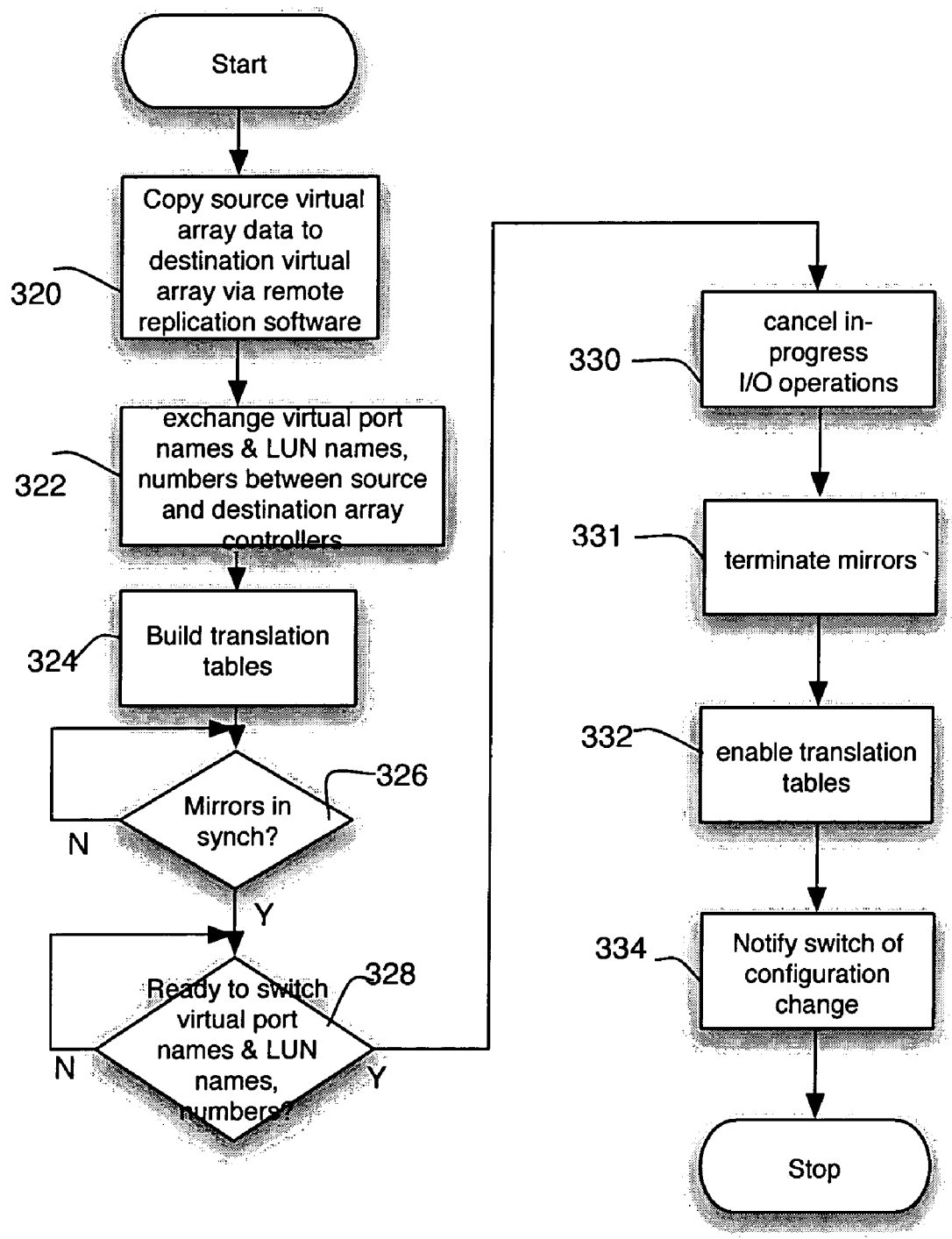
FIG. 22 is a flow diagram representing the general operation of the migration process as controlled by the source and destination array controllers.

The source array controller 44c and destination array controller 44d work together to generally perform the virtual port name and LUN name and number exchange process (FIG. 17 step 302) shown in FIG. 22. Accordingly, remote replication software is invoked to copy all the source array data to the destination array (step 320) via the dedicated link 310. Data migration products called MirrorView and SRDF/S (Symmetrix Remote Data Facility), both of EMC Corp. of Hopkinton, Mass., are examples of remote replication software that can be conveniently used. The remote replication software sets up a primary mirror, and copies that mirror and all updates to a secondary mirror.

Meanwhile, virtual port names, LUN names, and LUN numbers are swapped between the source and destination physical arrays 16a and 16b, also via the link 310 (step 322). Each array controller 44c and 44d builds one or more translation tables 83 and 85 respectively to map its current virtual port names, LUN names, and LUN numbers to new virtual port names, LUN names, and LUN numbers (step 324). Once the remote replication process indicates synchronization of the arrays (step 326), the arrays perform a handshake function to see whether the source and destination array controllers 44c and 44d are ready to switch virtual port names and LUN names and numbers (step 328). When both virtual arrays 210f and 210i are ready, any in-progress I/O activity is cancelled if necessary (step 330). (It may or may not be necessary to cancel in-progress I/O activity to the source and/or destination virtual array, as this is dictated by design considerations. Cancellation of in-progress I/O is shown here for completeness.) Then, the remote replication process is terminated and connections between the primary and secondary mirrors are severed (step 331). Each array's translation tables 83 and 85 are then activated (step 332), causing the new virtual port and LUN names and numbers to be used by the arrays 16a,b and thereby completing the exchange. The switch 14 is then notified of the configuration change (step 334), causing it to rebuild its name server database table 42. On receiving a state change notification from the switch, the hosts 12 then query the new database server table 42a from the switch and proceed to query the arrays 16a and 16b for LUN names and LUN numbers to rebuild their LUN tables 70a.

In accordance with an embodiment, the configuration change is indicated by causing the switch 14a to recognize a "link bounce". A link bounce causes temporary inaccessibility of the physical arrays 16a,b. The link bounce is transparent to the hosts 12. In accordance with Fibre Channel protocol, the switch 14a responds to the link bounce by re-building its name server database table 42a and sending it to all registered SAN devices. A link bounce may be caused for example by quickly disabling and re-enabling a Fibre Channel transmitter. It is understood, however, that the configuration change can be implemented in other manners. For example, the array 16b could cause a logout and subsequent login; or, a temporary I/O glitch could be caused. The invention can be implemented using any means for causing the switch 14a to recognize the configuration change.

Figure 23:
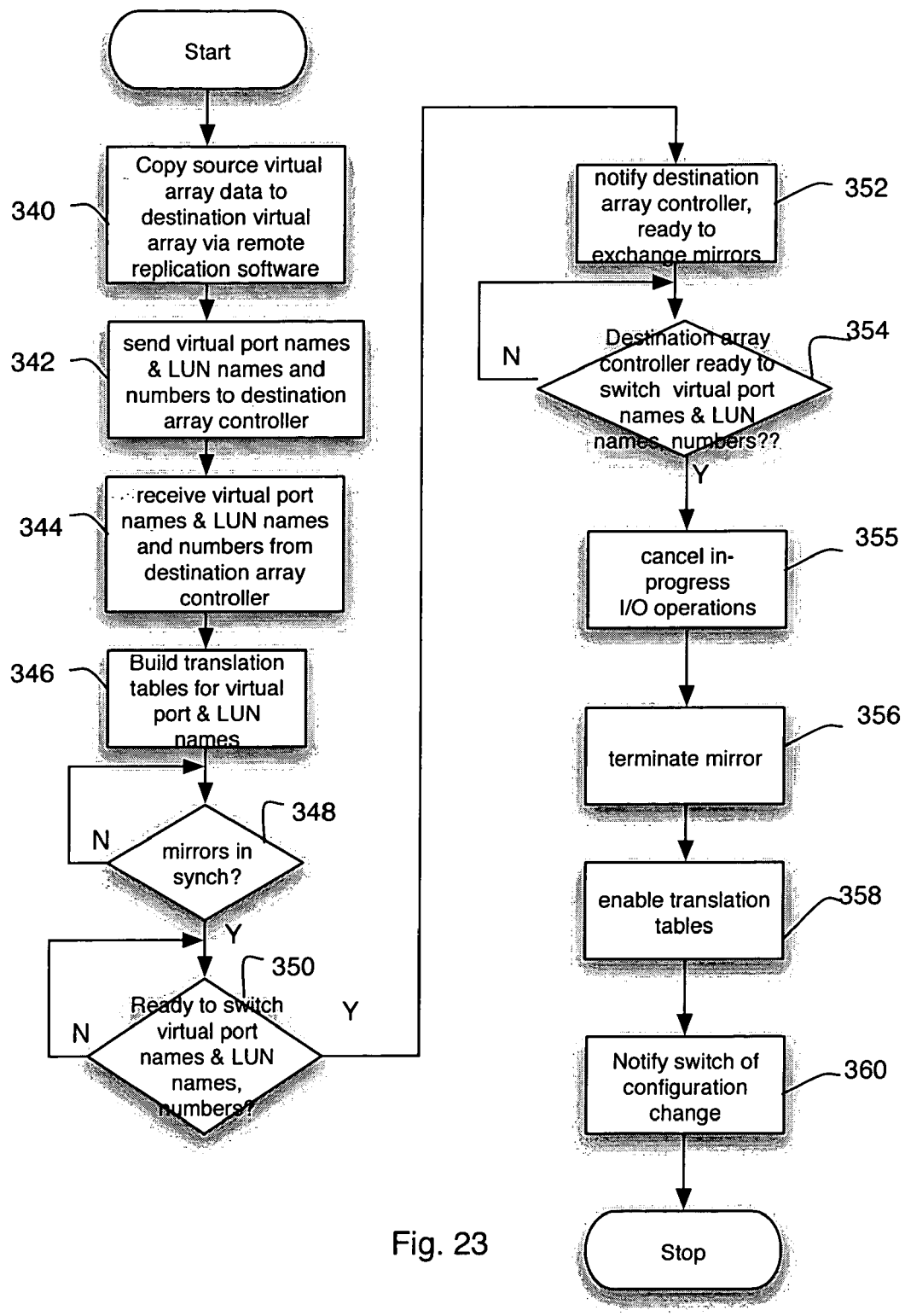
FIG. 23 is a flow diagram representing the operation of the source array controller.

In the preferred embodiment shown in FIG. 21, the functionality of FIG. 22 is distributed between the source array controller 44c and the destination array controller 44d. In FIG. 23, the operation of the source array controller 44c is shown. First, the remote replication software is invoked to copy the source virtual array 210f data to the destination virtual array 210i (step 340). While the data is being copied, the controller 44c sends the virtual port names and LUN names and numbers for the source virtual array 210f to the destination array controller 44d via the point-to-point link 310 (step 342). The controller 44c is also receiving virtual port names and LUN names and numbers for the destination virtual array (step 344). The source array controller 44c uses the virtual port names and LUN names and numbers received from the destination array controller 44d to build translation tables 83 for the virtual port names and LUN names and numbers. The translation tables 83a include virtual port name translation table 83b, LUN name translation table 83c, and LUN number translation table 83d.

Figure 24:
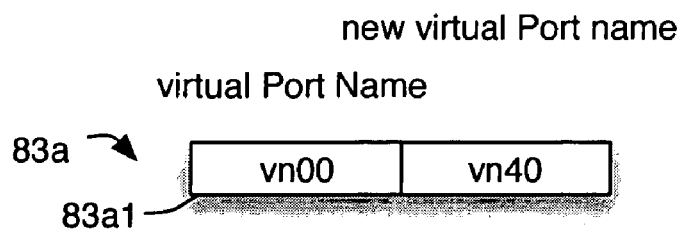
FIG. 24 is an example of a source virtual port name translation table after virtual port names have been exchanged between the source and destination virtual arrays.

An example of a virtual port name translation table 83a is shown in FIG. 24. The table 83a includes an entry for each virtual port for the virtual array 210f. Each entry contains the current virtual port name, and a new virtual port name received from the destination array controller 44b. One entry 83a1 exists in the virtual port name translation table 83a shown in FIG. 24, because there is a single virtual port associated with the virtual array 210f. The entry 83a1 associates the source virtual array port name vn00 with the destination virtual array port name vn40.

Figure 25:
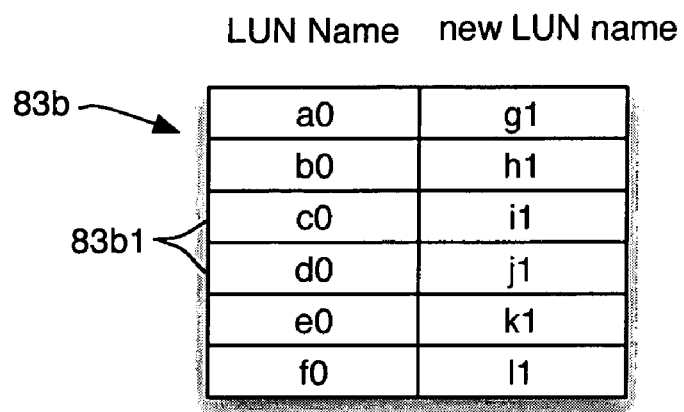
FIG. 25 is an example of source LUN name translation table after LUN names have been exchanged between the source and destination virtual arrays.
Figure 26:
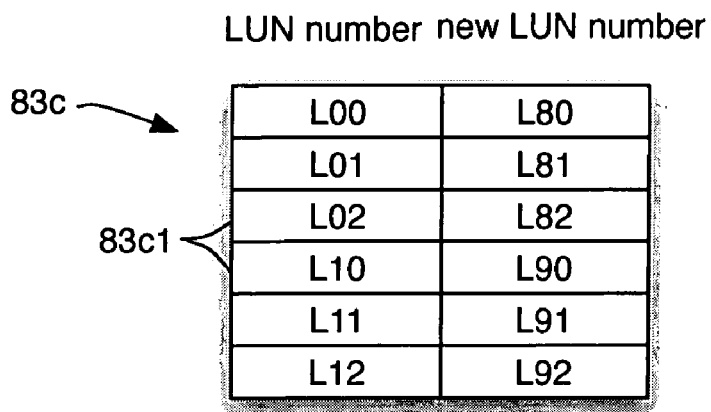
FIG. 26 is an example of a source LUN number translation table after LUN numbers have been exchanged between the source and destination virtual arrays.

The LUN name translation table 83b includes an entry 83b1 for each LUN. Each entry includes the current LUN name and a new LUN name received from the destination array controller 44b. An example of a LUN name translation table 83b is shown in FIG. 25. In this example, six entries 83b1 exist in the LUN translation table. The current source virtual array LUNs names a0, b0, c0, d0, e0, f0 are associated with the current destination virtual array LUN names g1, h1, i1, j1, k1, l1. An example of a LUN number translation table 83c is shown in FIG. 26. In this example, six entries 83c1 exist in the LUN number translation table 83c. The current source virtual array LUN numbers L00, L01, L02, L10, L11, L12 are associated with the current destination virtual array LUN numbers L80, L81, L82, L90, L91, L92 respectively. (It will be clear to the skilled artisan that the information in the tables 83a, b, c can be stored as one table, or separate tables, in accordance with design requirements and convenience.)

Referring back to FIG. 23, after the translation tables 83 have been built, the source array controller 44c checks to see if the remote replication software has synchronized the two arrays yet (step 348). If no mirror synch signal has been received, the controller 44c waits until mirror synch occurs. Now, the source array controller 44c checks to make sure it is ready to switch its virtual port names and LUN names and numbers (step 350). If ready, the source array controller 44c notifies the destination array controller 44d that the source array controller 44c is ready to switch virtual port names and LUN names and numbers (step 352), and checks to see if the destination array controller 44d is also ready to switch virtual port names and LUN names and numbers (step 354). If not, the controller 44c waits. When the destination array controller 44d indicates it is ready, the source array controller 44c, if necessary, cancels any in-progress I/O operations to the source virtual array 210f (step 355). Then remote replication process is terminated and connections between the primary and secondary mirrors are severed (step 356). The array controller 44c then enables its virtual port and LUN translation tables 83 (step 358). Now the source virtual array's virtual port names, LUN names, and LUN numbers are replaced with the destination virtual array's virtual port names, LUN names and LUN numbers that were received from the destination array controller 44d. The destination array controller 44d then causes a link bounce to notify the switch of the configuration change (step 360). Now the previously described switch name server database updates and host queries occur.

Figure 27:
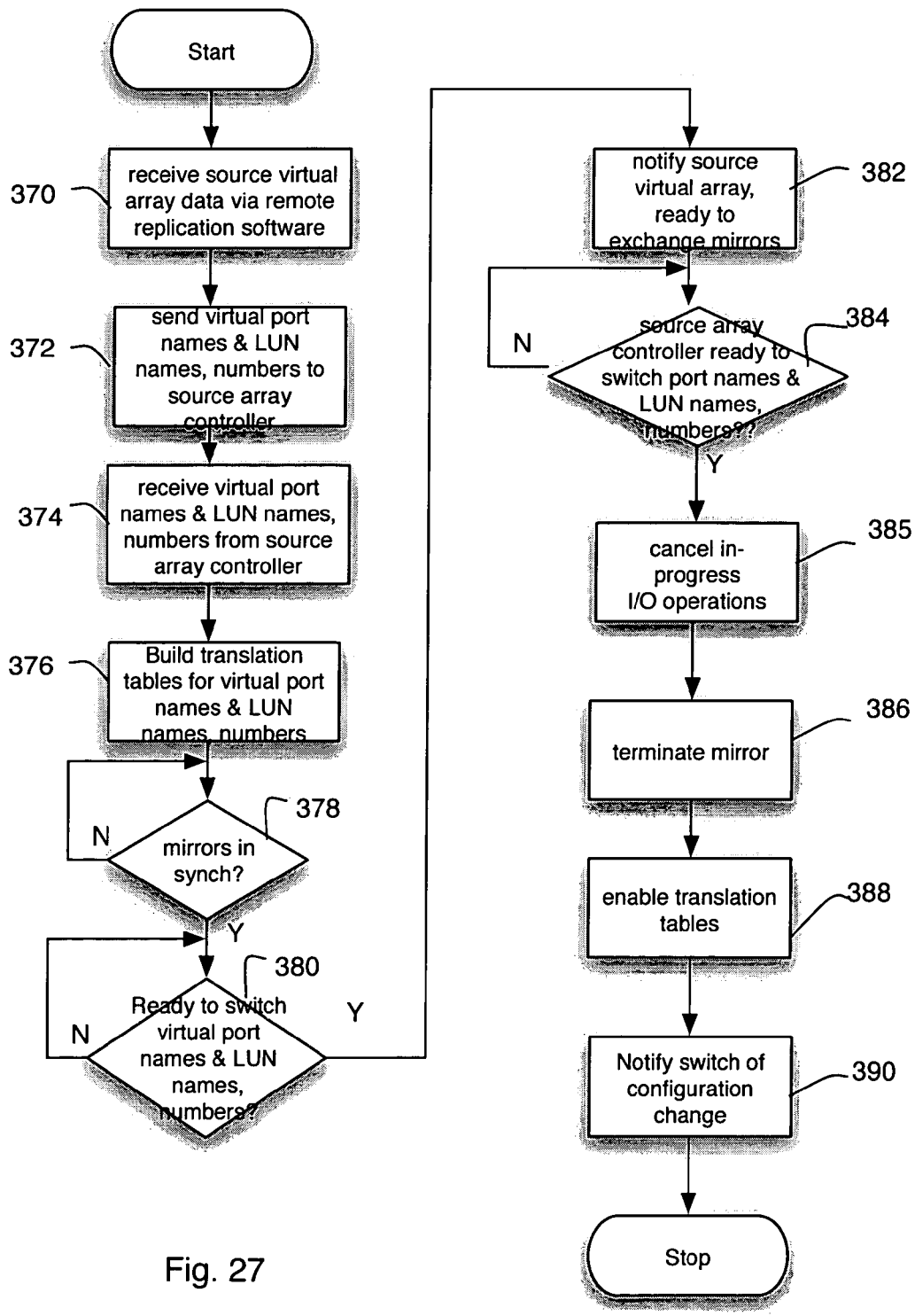
FIG. 27 is a flow diagram representing the operation of the destination array controller.

In FIG. 27, the operation of the destination array controller 44d is shown. First, the remote replication software is invoked to receive the data from the source array (step 370). While the data is being copied, the destination array controller 44d sends it virtual port names, LUN names, and LUN numbers to the source virtual array 16a via the point-to-point link 310 (step 372). The controller 44d is also receiving virtual port names, LUN names, and LUN numbers from the array controller 44c via the link 310 (step 374). The destination array controller 44d uses the virtual port names, LUN names, and LUN numbers received from the source controller 44c to build translation tables 85 for the virtual port names, LUN names, and LUN numbers.

Figure 28:
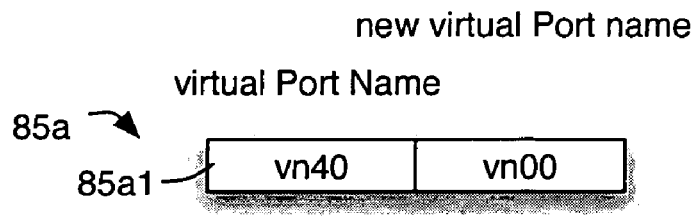
FIG. 28 is an example of a destination virtual port name translation table after virtual port names have been exchanged between the source and destination virtual arrays.

An example of a virtual port name translation table 85a is shown in FIG. 28. The table includes an entry 85a1 for each virtual port on the virtual array 210i. Each entry 85a1 contains the current virtual port name, and one of the new virtual port names received from the source array controller 44c. In this example, one entry 85a1 exists in the port translation table 85a. The entry 85a1 associates the destination virtual port name vn40 with the source virtual port name vn00.

Figure 29:
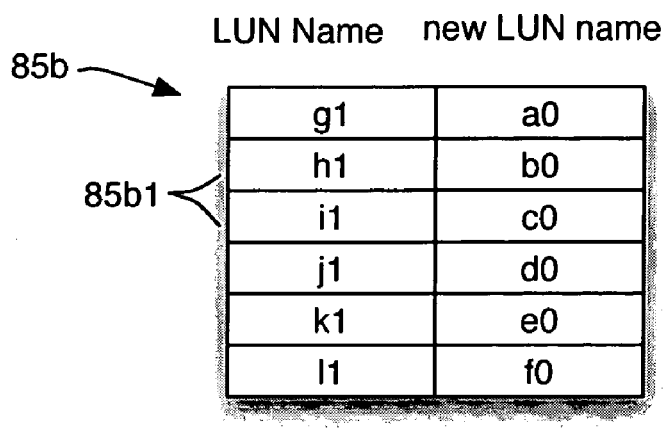
FIG. 29 is an example of destination LUN name translation table after LUN names have been exchanged between the source and destination virtual arrays.

The LUN name translation table 85b includes an entry 85b1 for each LUN 30. Each entry 85b1 includes the current LUN name and a new LUN name received from the source array controller 44c. An example of a LUN name translation table 85b is shown in FIG. 29. In this example, six entries 85b1 exist in the LUN name translation table 85b. The current destination virtual array LUNs g1, h1, i1, j1, k1, l1 are associated with the current source virtual array LUN names a0, b0, c0, d0, e0, f0.

Figure 30:
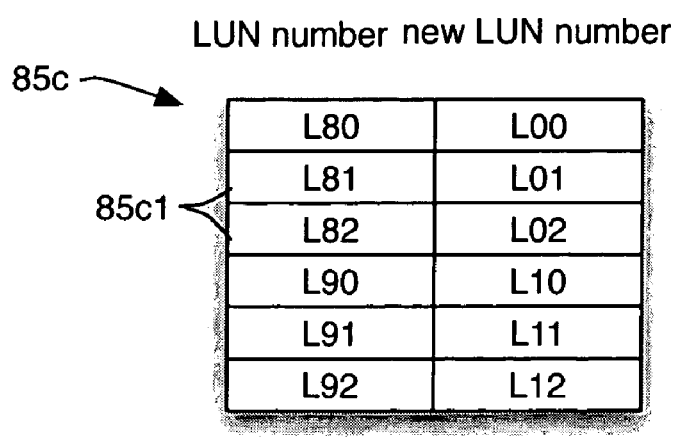
FIG. 30 is an example of a destination LUN number translation table after LUN numbers have been exchanged between the source and destination virtual arrays.

The LUN number translation table 85c also includes an entry for each LUN. Each entry 85c1 includes the current LUN number and a new LUN number received from the source array controller 44a. An example of a LUN number translation table 85c is shown in FIG. 30. In this example, six entries 85c1 exist in the LUN number translation table 85c. The current destination array LUN numbers L80, L81, L82, L90, L91, L92 are associated with the current source array LUN numbers L00, L01, L02, L10, L11, L12 respectively.

Figure 31:
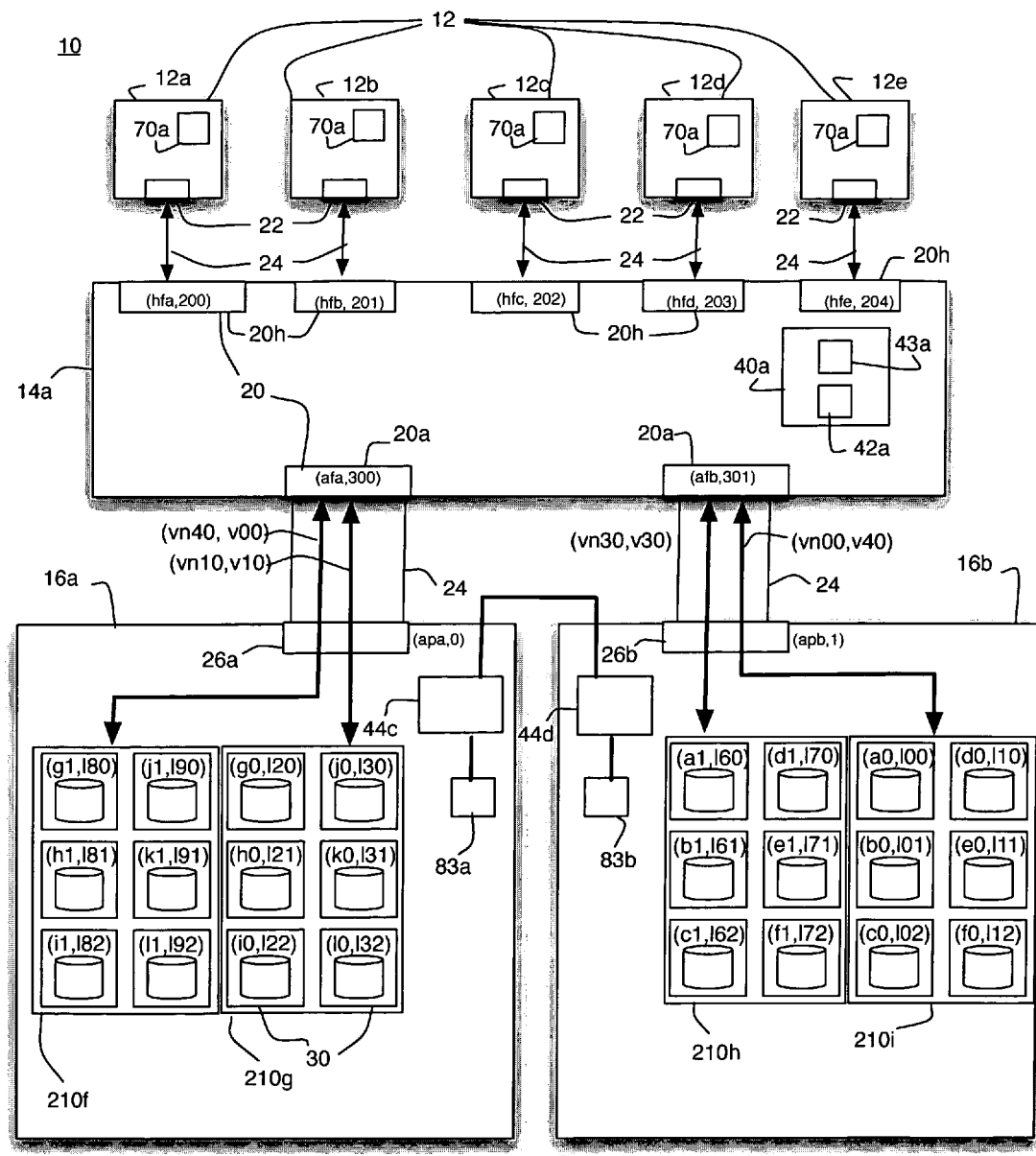
FIG. 31 is a representation of the storage area network of FIG. 21 after the source virtual array 210f has been migrated to the destination virtual array 210f.

Referring back to FIG. 27, after the translation tables 85 have been built, the destination array controller 44d checks to see if the remote replication software has synchronized the two arrays yet (378). If no mirror synch signal has been received, the controller 84 waits until mirror synch occurs. Now the destination array controller 44d checks to see if it is ready to switch virtual port names and LUN names and numbers (step 380). If so, the destination array controller 44d notifies the source array controller 44c that the destination array controller 44d is ready to exchange virtual port names and LUN names and numbers (step 382), and checks to see if the source array controller 44c is also ready to switch port and LUN names and LUN numbers (step 384). If not, the controller 44d waits. When the source array controller 44a indicates it is ready, the destination array controller 44d, if necessary, cancels any in-progress I/O operations to the destination virtual array 210i (step 385). The remote replication process is then terminated and connections between the primary and secondary mirrors are severed (step 386). The destination controller 44d then enables its port and LUN translation tables (step 388). Now the destination virtual array port names and LUN names and numbers are replaced with the array port names and LUN names and numbers that were received from the source array controller 44c. A link bounce is then caused to notify the switch of the configuration change (step 390). Now the previously described switch name server database update and host queries occur. The hosts 12 now see the same LUNs they saw before, but at different virtual port IDs. The storage system configuration now seen by the hosts is shown in FIG. 31. The destination virtual array 210i is now seen by the host as the source virtual array 210f.

Now that the source virtual array 210f has been migrated to the destination virtual array 210i, the virtual array 210f in the physical array 16a can continue in its current configuration as a secondary mirror, or its LUNs can be presented as a new presented virtual array.

FIGS. 23 and 27 set forth one of many possible embodiments for controlling the copy function and name and number exchange functions. The actions need not necessarily be performed in the order shown. For example, the array controllers 44c and 44d could wait until the remote replication process is synchronized before name and number exchanges occur. Furthermore, instead of using translation tables to implement the name and number switch, the names of the virtual ports and LUNs could simply be replaced. The invention encompasses all the various ways of performing the copy and name and number exchange functions. The virtual arrays 210f and 210i have been presented as identical—that is, they have the same number of virtual ports, and the same number and configuration of LUNs. A destination virtual array that is larger, or a superset, of the source virtual array could also be employed. This is one manner in which to upgrade virtual array capacity.

Furthermore, in some implementations it is not necessary to exchange the LUN numbers between the source and destination virtual arrays 210f and 210i. Some remote replication software applications (for example Mirror View) provide the required LUN number information. In this case, only the LUN names need be exchanged. The prior description describes the exchange of both LUN names and LUN numbers for completeness, with the understanding that the invention may be implemented by exchange of virtual port and LUN names only.

Figure 32:
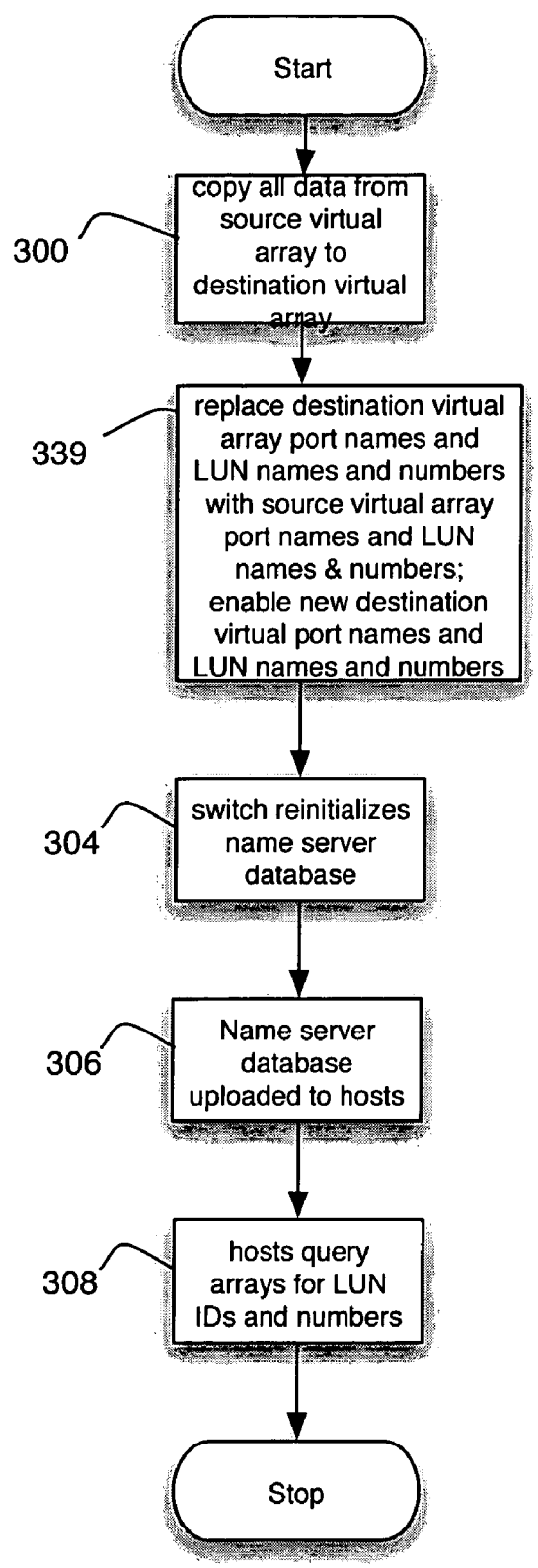
FIG. 32 is a flow diagram of an alternate embodiment of the general operation of the migration process as controlled by the source and destination array controllers.
Figure 33:
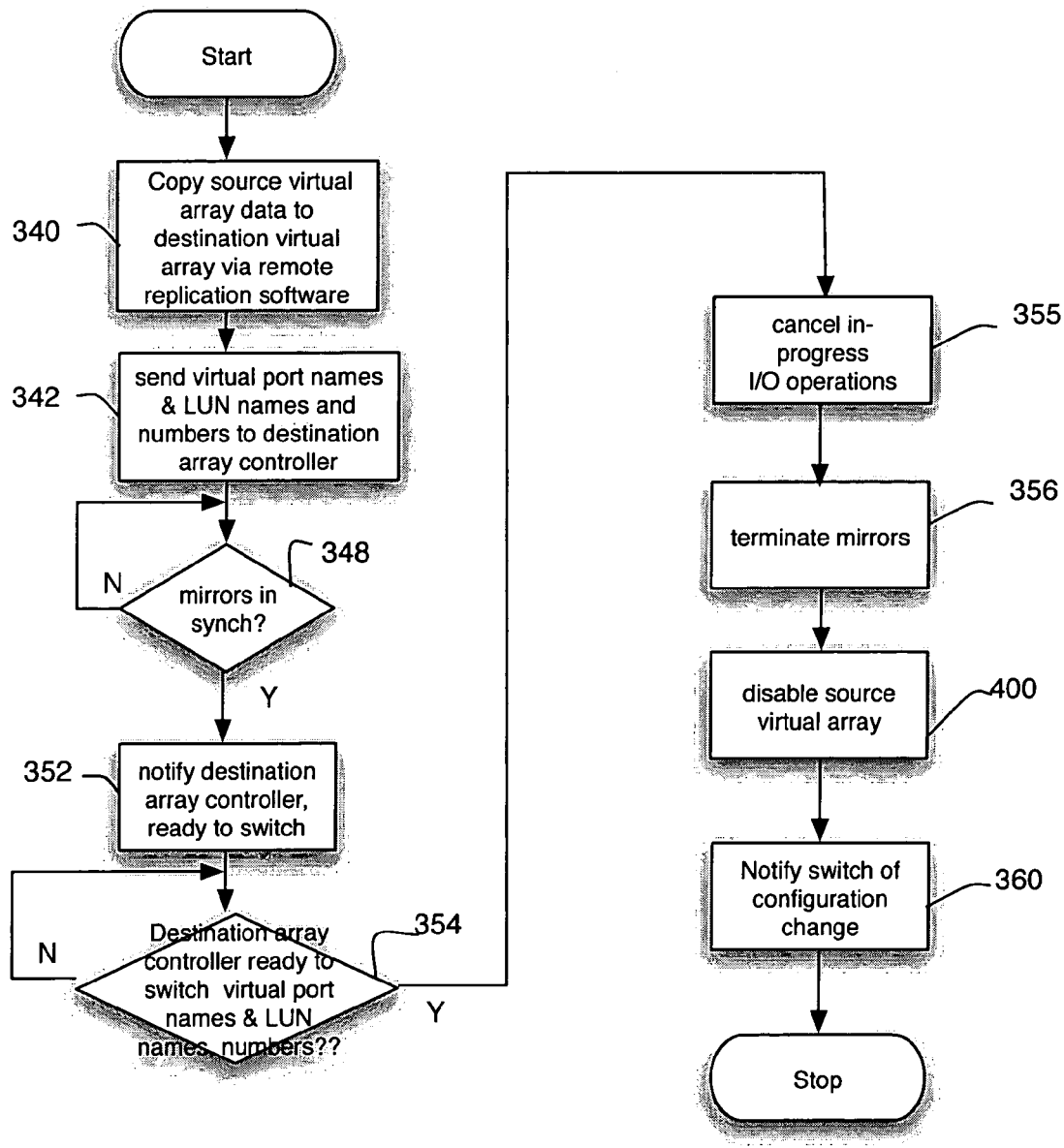
FIG. 33 is a flow diagram of an alternate embodiment of the source array controller process of FIG. 23 in a system where the destination virtual array port names and LUN names and numbers are replaced with the source virtual array port names and LUN names and numbers only.
Figure 34:
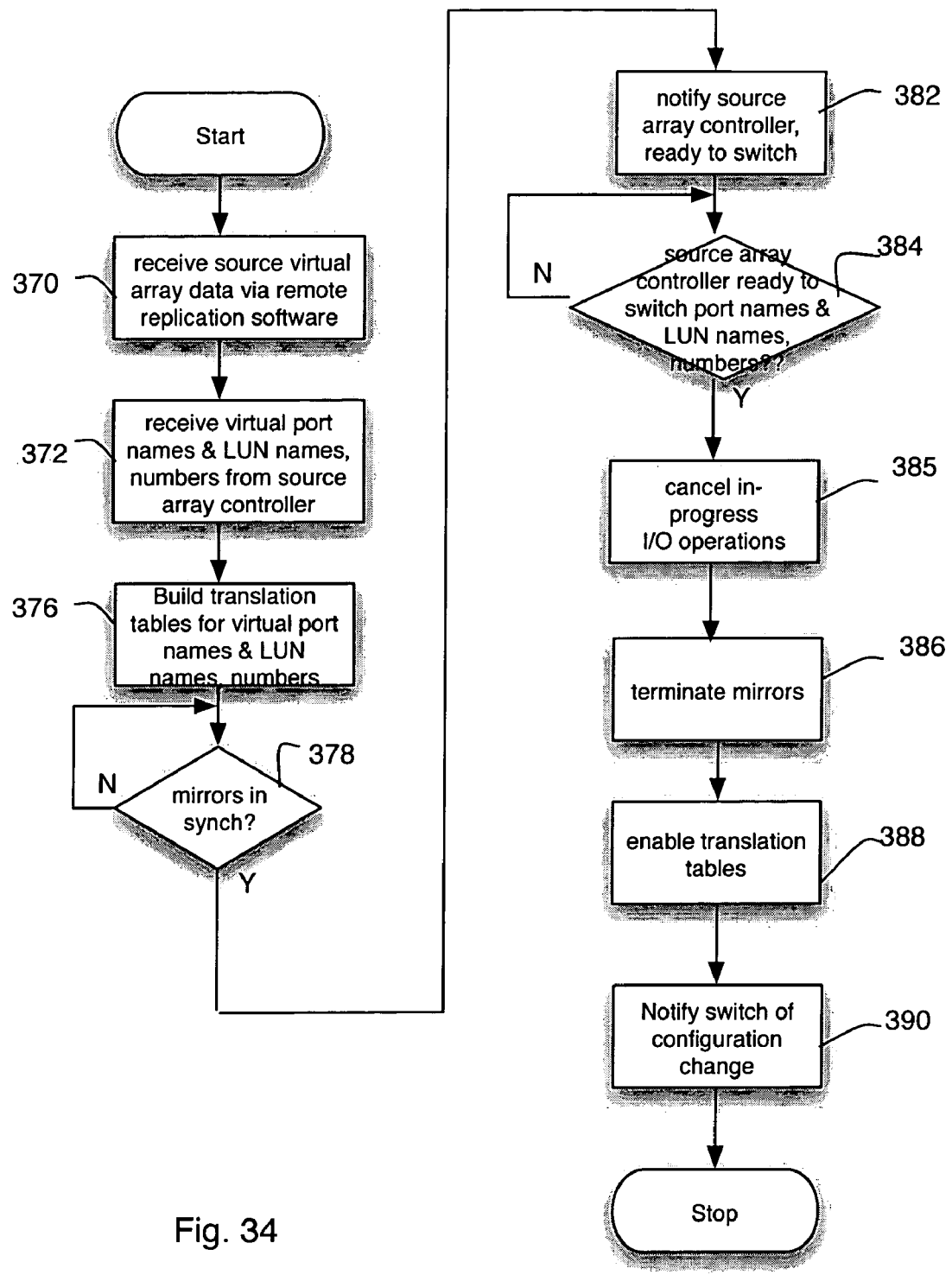
FIG. 34 is a flow diagram of an alternate embodiment of the destination array controller process of FIG. 27 in a system where the destination virtual array port names and LUN names and numbers are replaced with the source virtual array port names and LUN names and numbers only.
Figure 35:
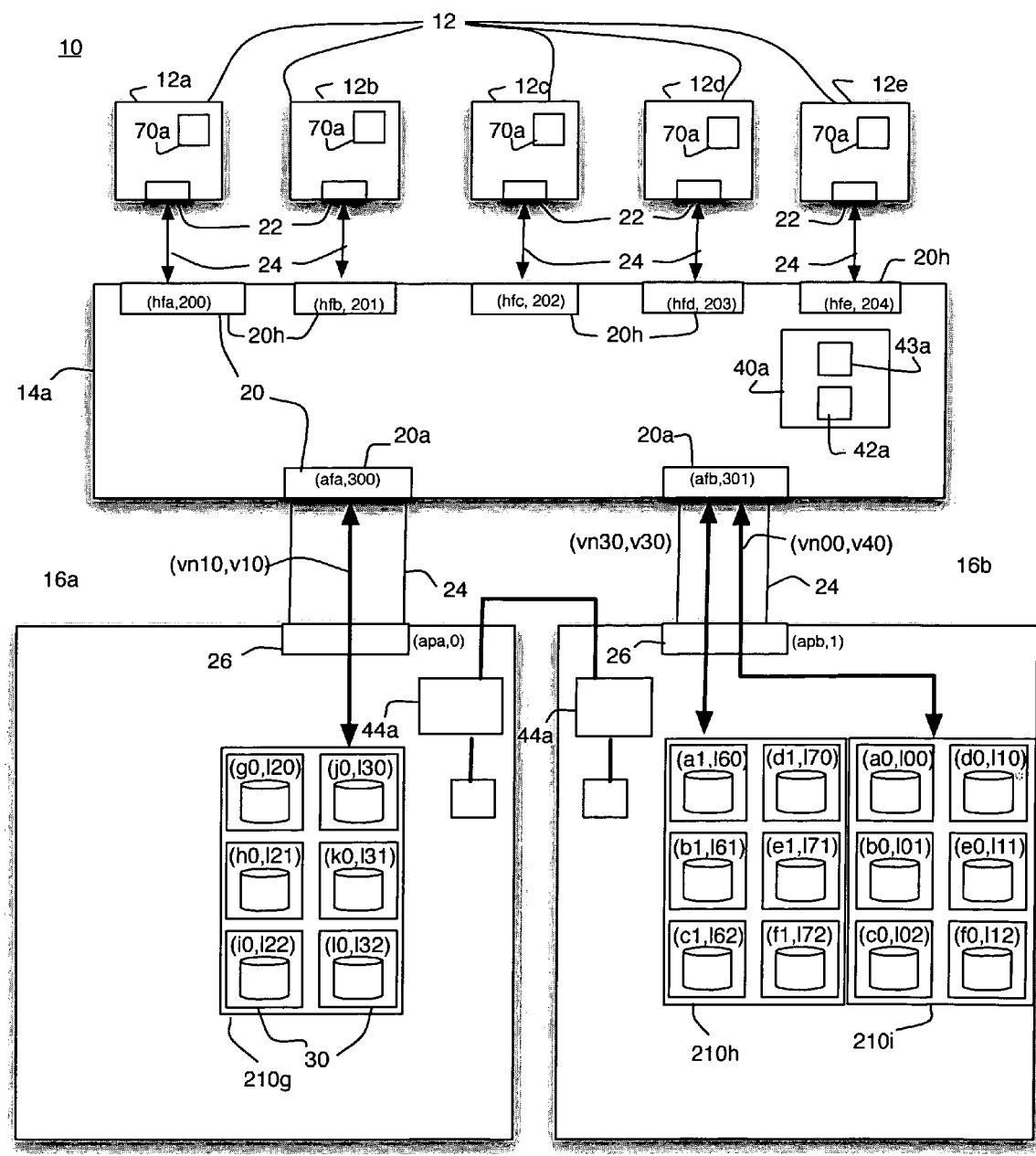
FIG. 35 is a representation of the storage area network of FIG. 21 after the source virtual array 210f has been migrated to the destination virtual array 210f in accordance with the processes of FIGS. 33 and 34.

In accordance with the second embodiment, it may be advantageous to simply copy the source virtual array data to the destination virtual array, and then replace the destination virtual array port names and LUN names and numbers with the source virtual array LUN names and numbers. In this case, after the link bounce, the destination virtual array appears as the source virtual array, and the source virtual array either disappears or is reinitialized as a new virtual array. One example of such an implementation is shown in FIGS. 32-35. In FIG. 32, an example of the general operation of the migration process is shown. FIG. 32 differs from FIG. 17 in that step 302 has been replaced with step 339. Rather than exchanging virtual port names and LUN names and numbers, destination virtual port names and LUN names and numbers are replaced with source virtual port names and LUN names and numbers. In FIG. 33, one possible example of alternate operation of the source array controller 44*c* is shown. FIG. 33 differs from FIG. 22 in that steps 344 346, and 350 have been eliminated. Step 358 now disables the source virtual array 210*f* instead of enabling the translation table 83. In FIG. 34, the operation of the destination array controller 44*d* is shown. FIG. 34 differs from FIG. 27 in that steps 374 and 380 have been eliminated. In FIG. 35, the resulting system 10 is shown wherein the virtual array 210*i* now appears on the physical array 16*b* as the original virtual array 210*f*, and the virtual array 210*f* on the physical array 16*a* has disappeared. Again, rather than disappearing, the virtual array 210*f* may be re-programmed as a new array.

Figure 36:
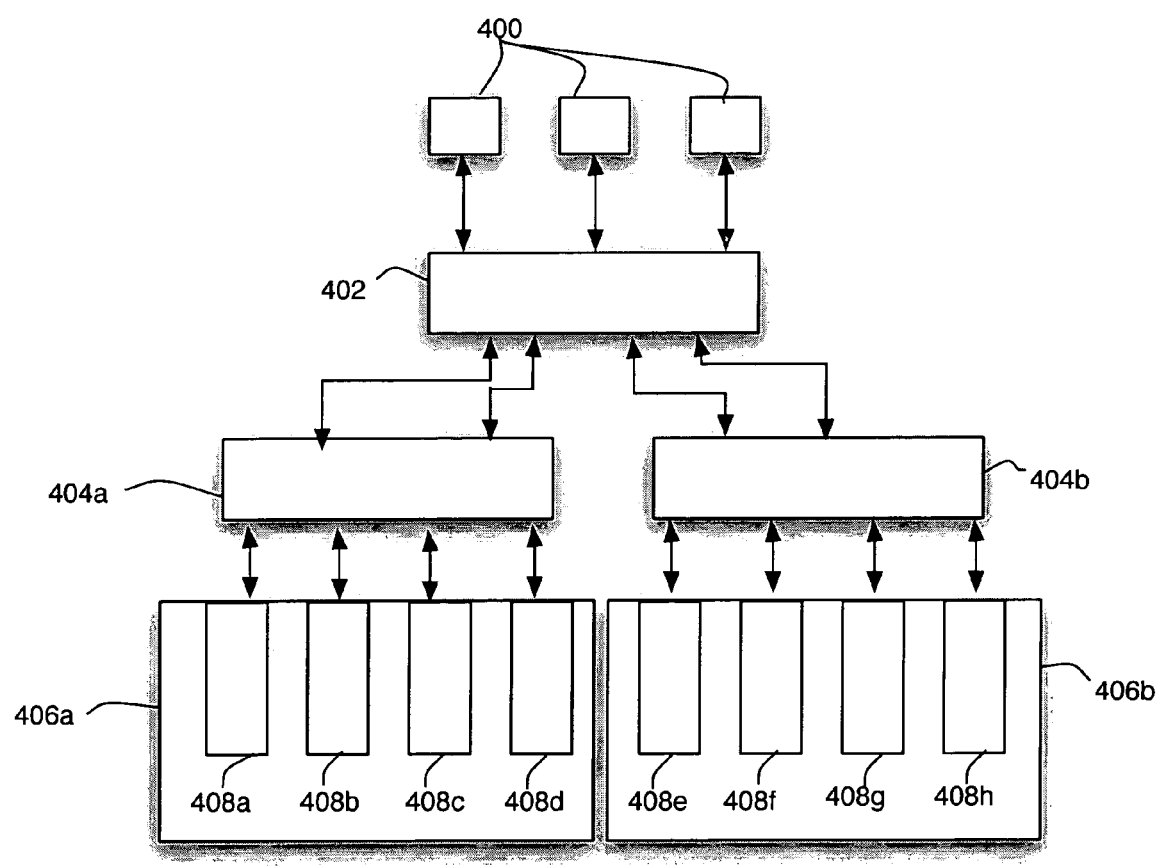
FIG. 36 is a representation of a hierarchical network system in which the invention can be implemented.

The above examples have been presented in terms of hosts accessing presented virtual arrays via a switch. However, devices other than hosts may take advantage of the ability to migrate presented virtual arrays. For instance, in a hierarchically coupled Fibre Channel network, the presented virtual arrays may be accessed by another Fibre Channel array or controller rather than a host. Such a system is shown in FIG. 36. Here, hosts 400 are coupled to a Fibre Channel switch 402. The Fibre Channel switch 402 is coupled to Fibre Channel switches 404*a* and 406*b*. The Fibre Channel switches 404*a* and 404*b* are coupled to storage arrays 406*a* and 406*b*. The storage array 406*a* is configured as four presented virtual arrays 408*a*, 408*b*, 408*c*, and 408*d*. The storage array 406*b* is configured as four presented virtual arrays 408*e*, 408*f*, 408*g*, and 408*h*. If, for example, the presented virtual array 408*a* is migrated to the presented virtual array 408*g* according to one of the methods previously described, each switch 404*a* and 404*b* name server database will be updated, and then the switch 402 name server database will be updated. The claims are intended to cover all such system configurations.

The present invention is not to be limited in scope by the specific embodiments described herein. Various modifications of the present invention, in addition to those described herein, will be apparent to those of ordinary skill in the art from the foregoing description and accompanying drawings. For example, the disclosed controllers can be implemented in hardware, software, or both. All such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for use in a storage system comprising a fabric having a database that associates Fibre Channel names and Fibre Channel addresses of Fibre Channel ports coupled to it, the apparatus comprising:
    a plurality of groups of logical units of storage;
    at least one physical port coupled to the groups through which the groups can be coupled to a fabric;
    each group assigned a unique virtual port address for each physical port to which it is coupled;
    a first said group comprising a source virtual array, the source virtual array having at least one source virtual port coupled to the fabric, each source virtual port having a source virtual port name and a source virtual port address;
    a second said group comprising a destination virtual array, the destination virtual array having one or more destination virtual ports coupled to the fabric, each destination virtual port having a destination virtual port name and a destination virtual port address;
    logic for copying all data resident on the source virtual array to the destination virtual array;
    logic for replacing the destination virtual port names with the source virtual port names;
    logic for causing the fabric to reload its name server database so that the database associates the source virtual port names with the destination virtual port addresses.

2. The apparatus of claim 1 wherein the source virtual array includes source LUNs for use by the host(s), each source LUN having a source LUN name and source LUN number, and wherein the destination virtual array includes destination LUNs for use by the hosts, each destination LUN having a destination LUN name and a destination LUN number, and wherein the logic for replacing further comprises logic for replacing the destination LUN names with the source LUN names.

3. The apparatus of claim 2 wherein the logic for replacing further comprises logic for replacing the destination LUN numbers with the source LUN numbers.

4. The apparatus of claim 3 further comprising a destination virtual port translation table associating the destination virtual port names with the source virtual port names, the destination translation table used by the logic for replacing for replacing the destination virtual port names with the source virtual port names.

5. The apparatus of claim 4 further comprising a destination LUN translation table associating the destination LUN names and numbers with the source LUN names and numbers, the destination LUN translation table used by the logic for replacing for replacing the destination LUN names and numbers with the source LUN names and numbers respectively.

6. The apparatus of claim 5 wherein the logic for replacing comprises a destination array controller capable of for enabling the destination port and destination LUN translation tables.

7. A program product comprising a computer readable medium having embodied therein a computer program for storing data, the computer program for operation in a system including a Fibre Channel fabric having a database that associates Fibre Channel names and Fibre Channel addresses of Fibre Channel ports coupled to it, a plurality of groups of logical units of storage, and at least one physical port coupled to the groups through which the groups can be coupled to a fabric, the program product comprising:
    logic for assigning to each group a unique virtual port address for each physical port to which it is coupled, a first said group comprising a source virtual array, the source virtual array having at least one source virtual port coupled to the fabric, each source virtual port having a source virtual port name and a source virtual port address, a second said group comprising a destination virtual array, the destination virtual array having one or more destination virtual ports coupled to the fabric, each destination virtual port having a destination virtual port name and a destination virtual port address;

logic for copying all data resident on the source virtual array to the destination virtual array;

logic for replacing the destination virtual port names with the source virtual port names;

logic for causing the fabric to reload its name server database so that the database associates the source virtual port names with the destination virtual port addresses.

8. The program product of claim 7 wherein the source virtual array includes source LUNs for use by the host(s), each source LUN having a source LUN name and source LUN number, and wherein the destination virtual array includes destination LUNs for use by the hosts, each destination LUN having a destination LUN name and a destination LUN number, and wherein the logic for replacing further comprises logic for replacing the destination LUN names with the source LUN names.

9. The program product of claim 8 wherein the logic for replacing further comprises logic for replacing the destination LUN numbers with the source LUN numbers.

10. The program product of claim 9 wherein the logic for replacing uses a destination virtual port translation table associating the destination virtual port names with the source virtual port names for replacing the destination virtual port names with the source virtual port names.

11. The program product of claim 10 wherein the logic for replacing uses a destination LUN translation table associating the destination LUN names and numbers with the source LUN names and numbers for replacing the destination LUN names and numbers with the source LUN names and numbers respectively.

12. The program product of claim 11 wherein the logic for replacing comprises a destination array controller capable of enabling the destination port and destination LUN translation tables.

13. A method for operation in a system comprising:

a Fibre Channel fabric having a database that associates Fibre Channel names and Fibre Channel addresses of Fibre Channel ports coupled to it, a plurality of groups of logical units of storage;

at least one physical port coupled to the groups through which the groups can be coupled to a fabric;

each group assigned a unique virtual port address for each physical port to which it is coupled;

a first said group comprising a source virtual array, the source virtual array having at least one source virtual port coupled to the fabric, each source virtual port having a source virtual port name and a source virtual port address;

a second said group comprising a destination virtual array, the destination virtual array having one or more destination virtual ports coupled to the fabric, each destination virtual port having a destination virtual port name and a destination virtual port address; the method comprising the steps of:

copying all data resident on the source virtual array to the destination virtual array;

replacing the destination virtual port names with the source virtual port names;

causing the fabric to reload its name server database for use by the host(s) so that the database associates the source virtual port names with the destination virtual port addresses.

14. The method of claim 13 wherein the source virtual array includes source LUNs for use by the host(s), each source LUN having a source LUN name and source LUN number, and wherein the destination virtual array includes destination LUNs for use by the hosts, each destination LUN having a destination LUN name and a destination LUN number, and wherein the step of replacing further comprises replacing the destination LUN names with the source LUN names.

15. The method of claim 14 wherein the step of replacing further comprises replacing the destination LUN numbers with the source LUN numbers.

16. The method of claim 15 wherein the step of replacing uses a destination virtual port translation table associating the destination virtual port names with the source virtual port names for replacing the destination virtual port names with the source virtual port names.

17. The method of claim 16 wherein the step of replacing uses a destination LUN translation table associating the destination LUN names and numbers with the source LUN names and numbers for replacing the destination LUN names and numbers with the source LUN names and numbers respectively.

18. The method of claim 17 wherein the step of replacing uses a destination array controller for enabling the destination port and destination LUN translation tables.

* * * * *